(12) United States Patent
Coleman et al.

(10) Patent No.: US 11,677,461 B2
(45) Date of Patent: Jun. 13, 2023

(54) RESOURCE ALLOCATION FOR APPLICATION DEPLOYMENT TO SATELLITE-LINKED COMMUNICATION NODES

(71) Applicant: NewSpace Networks, Inc., San Jose, CA (US)

(72) Inventors: Shaun B. Coleman, San Jose, CA (US); Robert Randall Cleave, Half Moon Bay, CA (US); John Edward Metzger, Campbell, CA (US)

(73) Assignee: NewSpace Networks, Inc., San Jose, CA (US)

( * ) Notice: Subject to any disclaimer, the term of this patent is extended or adjusted under 35 U.S.C. 154(b) by 0 days.

(21) Appl. No.: 16/910,162

(22) Filed: Jun. 24, 2020

(65) Prior Publication Data
US 2021/0184763 A1    Jun. 17, 2021

Related U.S. Application Data

(60) Provisional application No. 62/947,233, filed on Dec. 12, 2019.

(51) Int. Cl.
*H04B 7/185* (2006.01)
*H04W 72/04* (2009.01)
(Continued)

(52) U.S. Cl.
CPC ..... *H04B 7/18519* (2013.01); *H04B 7/18513* (2013.01); *H04B 7/18521* (2013.01);
(Continued)

(58) Field of Classification Search
CPC ............ H04B 7/18519; H04B 7/18513; H04B 7/18521; H04B 7/18528; H04W 76/25;
(Continued)

(56) References Cited

U.S. PATENT DOCUMENTS 6,317,603 B1  11/2001  Allison
7,454,527 B2  11/2008  Zhang et al.
(Continued)

FOREIGN PATENT DOCUMENTS

EP          2723001 A1   4/2014
WO     2017/093647 A1   6/2017

OTHER PUBLICATIONS

Ferrus, R. et al., "SDN/NFV-Enabled Satellite Communications Networks: Opportunities, Scenarios and Challenges," Physical Communication, vol. 18, Part 2, pp. 95-112, Mar. 2016.
(Continued)

*Primary Examiner* — Ian N Moore
*Assistant Examiner* — Rushil Parimal Sampat

(57) ABSTRACT

Systems, apparatuses, methods, and software are described herein that provide enhanced satellite link-coupled communication nodes. In one example, a parent communication node includes a communication interface configured to communicate with a plurality of child communication nodes over corresponding satellite communication links. The parent communication node includes a resource manager configured to determine physical resources local to each of the plurality of child communication nodes, establish a pool of resources from among the physical resources, and responsive to a request for execution of an application, allocate resources from the pool of resources for execution of the application at one or more selected child communication nodes. The parent communication node can initiate execution of the application using the allocated resources at the one or more selected child communication nodes.

21 Claims, 11 Drawing Sheets

(51) Int. Cl.
*H04W 76/25* (2018.01)
*H04W 84/06* (2009.01)

(52) U.S. Cl.
CPC ........ *H04B 7/18528* (2013.01); *H04W 72/04* (2013.01); *H04W 76/25* (2018.02); *H04W 84/06* (2013.01)

(58) Field of Classification Search
CPC .. H04W 72/04; H04W 84/06; H04L 41/5054; H04L 67/10; H04L 41/0843; G06F 9/44; G06F 9/48; G06F 9/50; G06F 9/5066; G06F 9/44505
See application file for complete search history.

(56) References Cited

U.S. PATENT DOCUMENTS

| | | | |
|---|---|---|---|
| 7,643,441 | B2 | 1/2010 | de La Chapelle et al. |
| 9,198,054 | B2 | 11/2015 | Cuff et al. |
| 9,681,337 | B2 | 6/2017 | Davis et al. |
| 9,740,465 | B1 | 8/2017 | Coleman et al. |
| 9,875,091 | B1 | 1/2018 | Coleman et al. |
| 10,206,161 | B2 | 2/2019 | Whelan et al. |
| 10,999,860 | B2 | 5/2021 | Johnson et al. |
| 2003/0018794 | A1 | 1/2003 | Zhang et al. |
| 2003/0087638 | A1 | 5/2003 | Taylor |
| 2004/0110467 | A1 | 6/2004 | Wang |
| 2006/0030311 | A1 | 2/2006 | Cruz et al. |
| 2013/0194132 | A1* | 8/2013 | Kim ................ G01S 19/20 342/357.64 |
| 2013/0194928 | A1 | 8/2013 | Iqbal |
| 2014/0155105 | A1 | 6/2014 | Cuff et al. |
| 2014/0226555 | A1 | 8/2014 | Bell et al. |
| 2016/0094417 | A1* | 3/2016 | Bonagiri ............. H04L 41/5054 709/226 |
| 2017/0041830 | A1 | 2/2017 | Davis et al. |
| 2017/0054800 | A1 | 2/2017 | DiVincenzo et al. |
| 2017/0324464 | A1 | 11/2017 | Hieb et al. |
| 2018/0046513 | A1 | 2/2018 | Breakstone et al. |
| 2018/0098248 | A1 | 4/2018 | Torres et al. |
| 2018/0109991 | A1 | 4/2018 | Whelan et al. |
| 2019/0089623 | A1 | 3/2019 | Dion et al. |
| 2019/0149479 | A1* | 5/2019 | Florissi ................. G16B 45/00 709/224 |
| 2019/0190591 | A1* | 6/2019 | Wang ................ H04B 7/18513 |
| 2019/0364584 | A1 | 11/2019 | Johnson et al. |
| 2020/0028579 | A1* | 1/2020 | Myers .................. G01S 13/765 |
| 2020/0028908 | A1* | 1/2020 | Coleman ................ H04L 67/12 |
| 2021/0117232 | A1* | 4/2021 | Sriharsha ............. G06F 9/3891 |
| 2021/0184761 | A1 | 6/2021 | Cleave et al. |

OTHER PUBLICATIONS

International Application No. PCT/US2020/039238, International Search Report & Written Opinion, 9 pages, dated Sep. 3, 2020.
International Application No. PCT/US2020/039242, International Search Report & Written Opinion, 10 pages, dated Sep. 8, 2020.
International Application No. PCT/US2020/039245, International Search Report & Written Opinion, 10 pages, dated Sep. 15, 2020.

* cited by examiner

RESOURCE ALLOCATION FOR APPLICATION DEPLOYMENT TO SATELLITE-LINKED COMMUNICATION NODES

RELATED APPLICATIONS

This application hereby claims the benefit of and priority to U.S. Provisional Patent Application 62/947,233, titled "SATELLITE TO GROUND EDGE DEVICES AND SYSTEMS," filed Dec. 12, 2019, which is hereby incorporated by reference in its entirety.

BACKGROUND

Satellite communication systems are emerging as a new mainstream communication medium. Various satellite system operators have begun to launch large constellations of satellites into various orbits and design configurations, and these constellations can include one or more satellites that are being positioned to provide end-user communication services. End-users, such as enterprise, consumer, and military users, can deploy ground-based satellite communication nodes which communicate over a satellite constellation. Present communications that are carried by the satellite communication systems largely include special-purpose communications for commercial and military applications, but increasingly these communications will include general-purpose communications, such as Internet access, media streaming, social media content, and web browsing. However, for terrestrial end-user devices, access to satellite constellations typically is limited to single satellite system operators and rely upon the infrastructure of the satellite system operators for the various activities, such as the communication, frequency, bandwidth, routing, and reliability of a single operator. As a result, entities may avoid the use of satellite communications, limiting the use of emerging satellite communication technology.

Overview

Systems, apparatuses, methods, and software are described herein that provide enhanced satellite link-coupled communication nodes. In one example, a parent communication node includes a communication interface configured to communicate with a plurality of child communication nodes over corresponding satellite communication links. The parent communication node includes a resource manager configured to determine physical resources local to each of the plurality of child communication nodes, establish a pool of resources from among the physical resources, and responsive to a request for execution of an application, allocate resources from the pool of resources for execution of the application at one or more selected child communication nodes. The parent communication node can initiate execution of the application using the allocated resources at the one or more selected child communication nodes.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Operators of satellite communication systems can deploy one or more satellite devices which operate independently or form constellations of satellite devices in various orbits and design configurations for communication services. End-users can deploy various terrestrial nodes, including stationary, mobile, seafaring, airborne mobile, or tethered airborne nodes which communicate over satellite communication links provided by a corresponding satellite communication system. These satellite communication links can transport specialized communications or general-purpose packet communications, such as Internet access, media streaming, and web browsing. Moreover, terrestrial communication nodes can be placed over various geographic areas to provide sensing or telemetry services, and associated data can be backhauled over the satellite communication links. These sensing and telemetry services might employ sensors, sensing devices, Internet-of-Things (IoT) devices, or other devices local to an associated terrestrial communication node. The examples herein discuss various terrestrial communication nodes, communication systems, and control techniques to provide enhanced communication services to end-users that employ satellite communication links.

Figure 1:
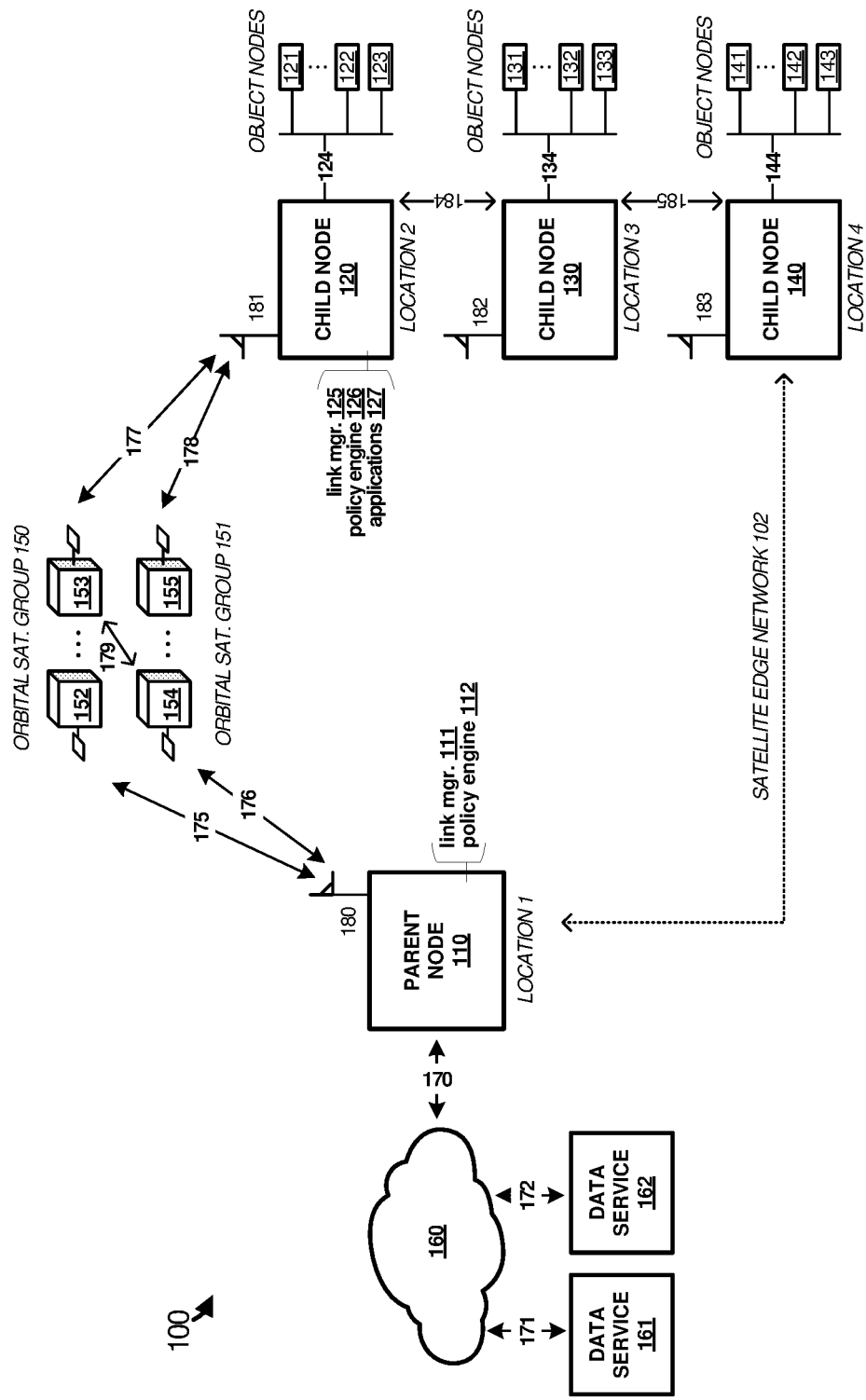
FIG. 1 illustrates a communication environment according to an implementation.

In a first example, FIG. 1 is presented. FIG. 1 includes communication environment 100 having various communication nodes comprising parent node 110 and child nodes 120, 130, and 140. Each child node comprises an associated satellite communication interface 181-183, and each child node can communicate over at least one satellite communication link. Two exemplary satellite communication links 177-178 are shown for child node 120. These satellite communication links are provided by one or more satellite communication service providers, such as a first orbital satellite group 150 and a second orbital satellite group 151 having satellite devices 152-153 and 154-155, respectively. Parent node 110 includes satellite communication interface 180 and communicates over one or more satellite communication links, shown in FIG. 1 as exemplary links 175-176. Parent node 110 also communicates with packet communication system 160 over communication link 170. Data services 161-162 illustrate various cloud computing, distributed data storage, or data handling services which may be employed by other elements of environment 100. Data services 161-162 communicate over communication links 171-172, respectively.

In operation, parent node 110 establishes communication arrangements with one or more child nodes over satellite communication links, referred to as satellite edge networks (SENs). These SEN communication arrangements can include various local area network (LAN) or wide area network (WAN) arrangements, as well as various communication links. In FIG. 1, SEN 102 is formed over various satellite communication links to couple parent node 110 and one or more among child nodes 120, 130, and 140 in a SEN arrangement. Moreover, parent node 110 can establish one or more connections or routes to other external systems over one or more network links including link 170. SEN 102 can thus span over one or more satellite communication links, one or more satellite groups or satellite communication service providers, one or more network arrangements, and one or more child nodes. Child nodes 120, 130, and 140 can be coupled to each other over an associated SEN arrangement, or over one or more links 184-185. Child nodes 120, 130, and 140 can be coupled to one or more object nodes coupled over associated local communication interfaces 124, 134, and 144, which might comprise network interfaces, point-to-point electrical interfaces, wireless interfaces, or optical interfaces, among others, including combinations thereof. In FIG. 1, child node 120 is coupled to object nodes 121-123, child node 130 is coupled to object nodes 131-133, and child node 140 is coupled to object nodes 141-143. Child nodes 120, 130, and 140 can transfer data over one or more satellite links, among other links discussed herein, which may include communication involving more than one satellite or satellite link concurrently, bonded, or in a broadcast manner, with one or more satellites configured to route traffic of the child nodes to various destinations including additional satellites.

Each child node might be located in a same or different geographic location with respect to each other, and these different locations might correspond to visibility to different satellites at any given time. FIG. 1 shows three locations (2, 3, 4) which are distinct from each other and from location 1 of parent node 110. Although stationary child nodes are shown in FIG. 1 for clarity, any of these child nodes might instead comprise mobile nodes associated with a mobile and/or relocatable user device, ground surface vehicle, watercraft, ship, submersible, other satellite devices, or airborne vehicle. Nodes might be stationary/tethered into place, or may be in motion, including combinations thereof. Additionally, one or more child devices might be co-located at a similar or same geographic location or within the same device or mobile entity.

Figure 2:
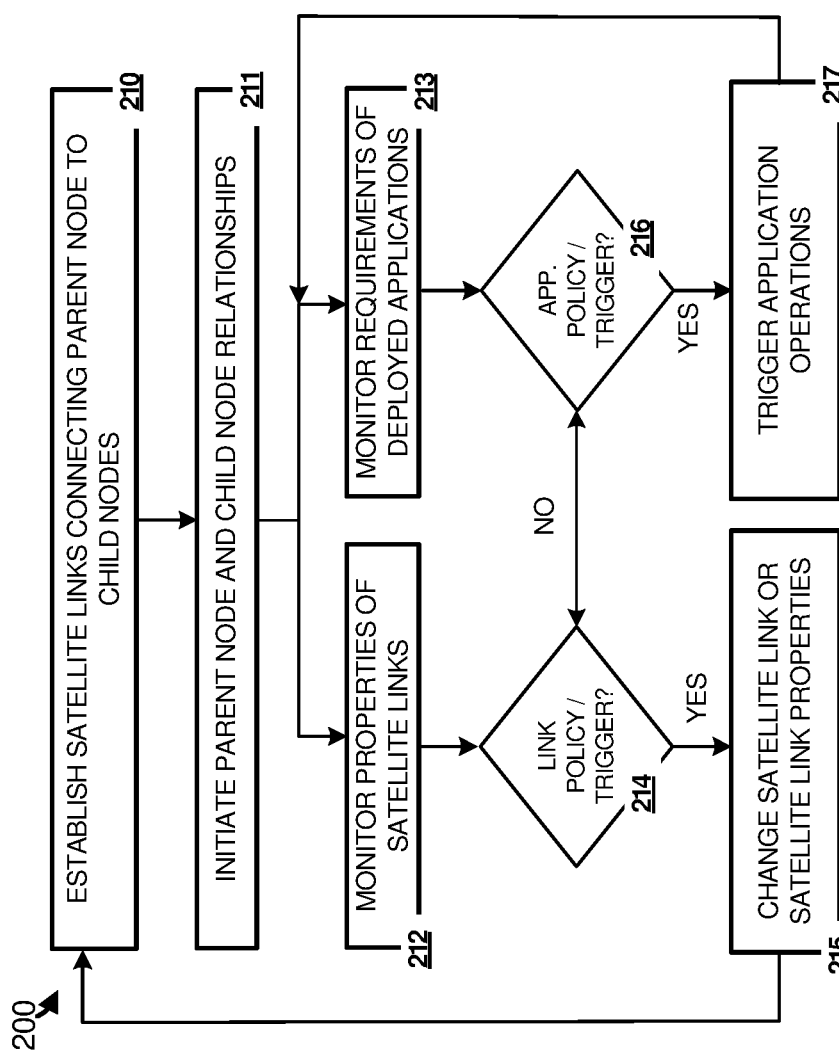
FIG. 2 illustrates example operations for a communication system according to an implementation.

FIG. 2 is presented to illustrate example operations 200 of the elements of FIG. 1. In FIG. 2, connectivity of parent node 110 and child nodes 120, 130, and 140 is established (210) with at least satellite communication links communicatively coupling parent node 110 to selected child nodes 120, 130, and 140. The satellite communication links establish at least a link layer connection using satellite communication links provided by satellite communication service providers, such as that of satellite group 150 or satellite group 151. Each communication node among parent node 110 and child nodes 120, 130, and 140 can independently establish link connectivity with a satellite communication system over satellite communication links of satellite group 150 or satellite group 151.

Once connected, then a logical relationship or SEN relationship among parent node 110 and selected child nodes 120, 130, and 140 is established by parent node 110. Parent node 110 can discover one or more child nodes located remotely from parent node 110. Discovery of the child nodes might be predetermined such as by indicating parameters of each child node to parent node 110, which might include network addresses, node identifiers, or other parameters which allow for traffic exchange between parent node 110 and associated child nodes. In other examples, parent node 110 performs a discovery process over satellite communication links which couple to each child node. Once selected child nodes are discovered or identified by parent node 110, then parent node 110 initializes each child node into a desired arrangement, such as a SEN arrangement.

Specifically, in FIG. 2, parent node 110 initiates (211) parent node and child node relationships. These relationships comprise logical correspondences among various communication nodes which define parent node 110 as a primary node which controls operations and maintains communication arrangements with one or more secondary nodes selected among child nodes 120, 130, and 140. Typically, parent node 110 establishes a SEN arrangement with selected child nodes, which might include establishing a network transport layer (or higher layers in a network stack) to service a SEN relationship among parent node 110 and selected child nodes. Moreover, parent node 110 can deploy software elements, such as applications, to child nodes, as well as instruct child nodes on connectivity adjustments or communication link changes, among other command and control functions. Parent node 110 might be configured by a network operator or network manager with one or more parameters or instructions that indicate or identify which child nodes should be included in a parent-child arrangement, as well as other parameters that configure SEN arrangements among such nodes.

Parent node 110 is shown in FIG. 1 as predetermined as a parent node. However, the functionality and features that define a parent node as such might be portable or transferrable. In one example, parent node functionality can be taken over by a child node, where that child node can be elevated from a subordinate node into a parent node. The parent node functionality might be encapsulated into one or more software objects accompanied by state information. The software objects might comprise one or more applications, virtualized applications, containers, virtual nodes, or other configurations. The state information can include information identifying child nodes, status of the various child nodes, satellite communication link status and identifiers, network addressing information for communication nodes, failure information related to why a previous parent node failed, object node locations and properties, resources at child nodes, and pool resource information, among other information. In addition, the state information might include a current state of SEN 102 indicating child/parent node members, locations, activity status, network addressing, link configurations, deployed applications, used/free resources, and other information. Failure of a parent node can trigger a child node to take over and resume the activities and function of the failed parent node. Non-failure transfers of role from child to parent can also occur, such as when a parent node experiences reduction in communication link bandwidth or availability, planned outages, user-initiated role changes, or other triggers.

During operation of the communication nodes, each communication node monitors (212) properties of a satellite communication link or links which communicatively couple the communication nodes into the arrangement established in operation 211. For example, parent node 110 and child nodes 120, 130, and 140 might be arranged into SEN 102 which comprises a network transport layer separate from or in addition to any provided by satellite communication service providers. To couple into SEN 102, each communication node employs an associated satellite communication link. However, each individual satellite communication link might experience various changes in link properties or link status over time. The changes in the properties of the satellite communication links can indicate a communication link quality falling below a quality threshold or a link status not meeting one or more criteria such as bit error rate, data rate, latency, or other parameters. These changes might affect connectivity or communications carried by each satellite communication link and by SEN 102 as a whole. Moreover, deployed applications or control instructions initiated by parent node 110 to child nodes might experience difficulty in deployment, execution, or completion when properties of the satellite communication links change.

Figure 5:
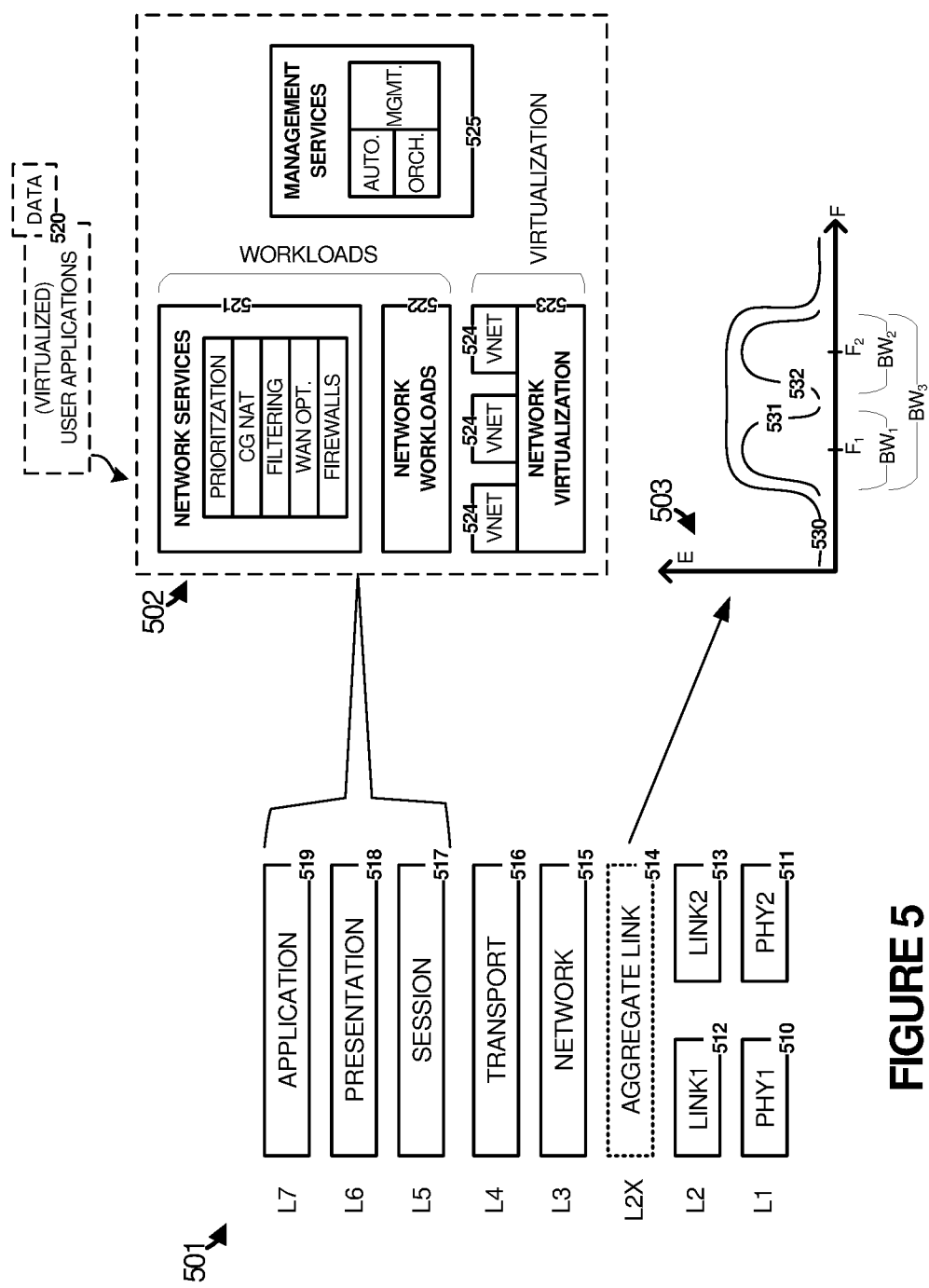
FIG. 5 illustrates communication layers according to an implementation.

At least a portion of the link monitoring activities of operation 212 might instead be performed by the satellite communication service providers which provide the satellite communication links. Many times, the satellite communication service providers monitor link status for all connected devices or nodes, and can determine when link status changes from a physical layer or link layer, among other layers of a network stack or protocol stack. FIG. 5 illustrates some example network stack arrangements, and the satellite communication service providers might be tasked with monitoring performance, status, and operation for layers L1 and L2. The satellite communication service providers can then provide indications of the performance, status, and operation for layers L1 and L2 to one or more of the communication nodes of FIG. 1. In some instances, satellite communication service providers can make adjustments to the satellite communication links and notify the communication nodes of FIG. 1 of the adjustments.

Monitored link properties can include link signal strength, link availability, link carrier frequency, link center frequency, link modulation type, link spreading scheme, link bandwidth, link power level, link channelization property, link latency, link routing, a satellite communication services provider of the link, orbital configuration of satellites providing the link, link security measures, link protocol, link compression type, link quantity, and other link properties which might change over time. To monitor the link properties of the satellite communication links, each communication node can include a link manager. In FIG. 1, parent node 110 includes link manager 111, while child node 120 includes link manager 125. Other child nodes can include similar elements as child node 120, and these elements are omitted in FIG. 1 for clarity. Link manager 111 and link manager 125 can monitor link properties or signal properties for associated satellite communication links. Link manager 111 can monitor satellite communication links 175-176, and link manager 125 can monitor links 177-178. Link manager 111 and link manager 125 can share monitoring duties for the various links in FIG. 1.

In addition to link properties, requirements for applications deployed to child nodes or executed by child nodes can also be monitored (213). Child node 120 shows applications 127 deployed by parent node 110. Other child nodes can have similar configurations. Each child node includes a policy engine to perform monitoring of deployed applications. FIG. 1 shows policy engine 126 for child node 120, and child nodes 130 and 140 can include similar features. Parent node 110 might include policy engine 112 to perform similar functionality to that of the policy engines of each child node. The application requirements might include properties, status, or physical components preferred or required for execution of an application at a child node or execution of an application across more than one child node. The application requirements can include communication properties preferred or required for execution of the one or more applications or for transfer of data by the child node which can be related to the one or more applications. These various application requirements can comprise a user policy associated with the one or more applications, an application protocol employed by the one or more applications, an anticipated change in communication or communication needs of the one or more applications, a communication reliability requirement of the one or more applications, a communication performance requirement of the one or more applications, a communication bandwidth requirement of the one or more applications, a communication latency requirement of the one or more applications, and a communication legality or government regulation associated with the one or more applications, among other requirements or preferences for applications.

Policy engine 126 determines (214) if one or more link policy conditions or link triggers have been met while monitoring the link properties determines (216) if one or more application policy conditions or application triggers have been met while monitoring the application requirements. Turning first to the link policy conditions or link triggers, the one or more link conditions or link triggers can prompt policy engine 126 to initiate changes via link manager 125 to the one or more satellite communication links. In addition to the criteria, requirements, status, or thresholds for properties mentioned above, the one or more link triggers might also comprise at least one among a signal strength threshold for the one or more satellite communication links, a link availability status change for the one or more satellite communication links, jamming conditions for the one or more satellite communication links, and a preemption activity affecting the one or more satellite communication links, among other triggers. Preemption activities can include government preemption for usage of communication links or satellites, commercial preemption of communication links or satellites for higher-priority entities or users, or preemption related to maintenance and administrative activities for the communication links or satellites.

In response to the link conditions or triggers, policy engine 126 enacts changes (215) to the satellite link or to one or more satellite link properties by instructing link manager 125 in accordance with the changes. Altering the properties of the one or more satellite communication links can include changing a the satellite communication link to a different communication link or altering at least one among a physical communication pathway, a communication link frequency, a communication link modulation type, a communication link bandwidth, a communication link power level, a communication link channelization property, a communication link latency, a communication link routing, and a satellite network providing the one or more satellite communication links, among other alterations. Operation of policy engine 126 may include link management and link changes at a link layer, and might instead include link management or changes at a 'higher' layer of a network stack or protocol, such as seen in FIG. 5. Furthermore, link manager 125 might enact the changes to the satellite link properties by indicating desired changes to a satellite communication service provider which responsively initiates the changes.

In one example, responsive to changes in properties of a satellite communication link indicating a communication link quality falling below a quality threshold or not meeting a policy-based preference, policy engine 126 is configured to select a different communication pathway or different communication link to accommodate at least the communication requirements. In FIG. 1, a first satellite communication link for child node 120 includes link 177 which is provided by orbital satellite group 150. Link 177 might be an initial link established for child node 120 and having initial properties which support a particular set of application requirements. However, changes in the properties or applications requirements can trigger changes to link 177. These changes might include various changes to the link properties discussed above, such as a different communication frequency, different bandwidth, different power level, different gain, different communication coding scheme, different data or signal compression scheme, different routing, or different beam alignment, among other changes. However, these changes can also include changing to a second communication link provided by the same satellite, a different satellite, or a different satellite communication service provider, as well as changing to a different communication beam. The second communication link might comprise link 178 established with orbital satellite group 151.

Thus, policy engine 126 might select a different communication pathway and different satellite communication service provider than that of link 177 to accommodate at least the communication requirements or application requirements. Policy engine 126 might direct link manager 125 to discontinue satellite communication link 177 and communicate over satellite communication link 178. Policy engine 126 might instead direct link manager 125 to establish a combined communication bandwidth associated with satellite communication link 177 and satellite communication link 178. Link manager 125 can provide the combined communication bandwidth of links 177 and 178 to at least an application of child node 120 that is associated with the communication requirements. Although link 178 is shown as a different satellite-based communication link selected for communication node 120, a different selected communication pathway can instead comprise a communication link provided by an airborne node or terrestrial node that has link availability with orbital satellite group 150/151 or a terrestrial communication network.

The one or more application triggers might also comprise at least one among a change in execution status of the one or more applications, anticipated application execution, presence of newly deployed applications, or change in communication link status to support activities of one or more applications. Application triggers can prompt policy engine 126 to trigger (217) application operations. Policy engine 126 can initiate execution of one or more applications or initiate activities of one or more executing applications based on the application triggers. Certain applications or certain functions of the applications might prefer or require certain communication link properties, such as bandwidth, power, data rate, encryption type, satellite, latency related to link distance, communication provider, time of day, or other link properties. Policy engine 126 can determine what activities are supported by present communication link properties, and enable or initiate application operations based on these present properties. One example includes starting a video data downloader when there is sufficient available bandwidth of a communication link and the present time of day is not during a peak timeframe. Another example includes policy engine 126 to inhibit data transfer for one or more applications while enabling data caching functionality for that data when communication link bandwidth power, or availability is below a target threshold level. Policy engine 126 can initiate transfer of portions of the cached data or instruct applications to bundle data for burst transfer periodically or responsive to communication link bandwidth being above a target threshold level or during certain times of day or days of the week. In yet a further example, quality of service (QoS) for applications can be considered, and when QoS levels are not being met, then link or application changes might be performed. Policy engine 126 or other elements might monitor QoS metrics and trigger changes to applications, links, or operations based on these QoS metrics.

Figure 3:
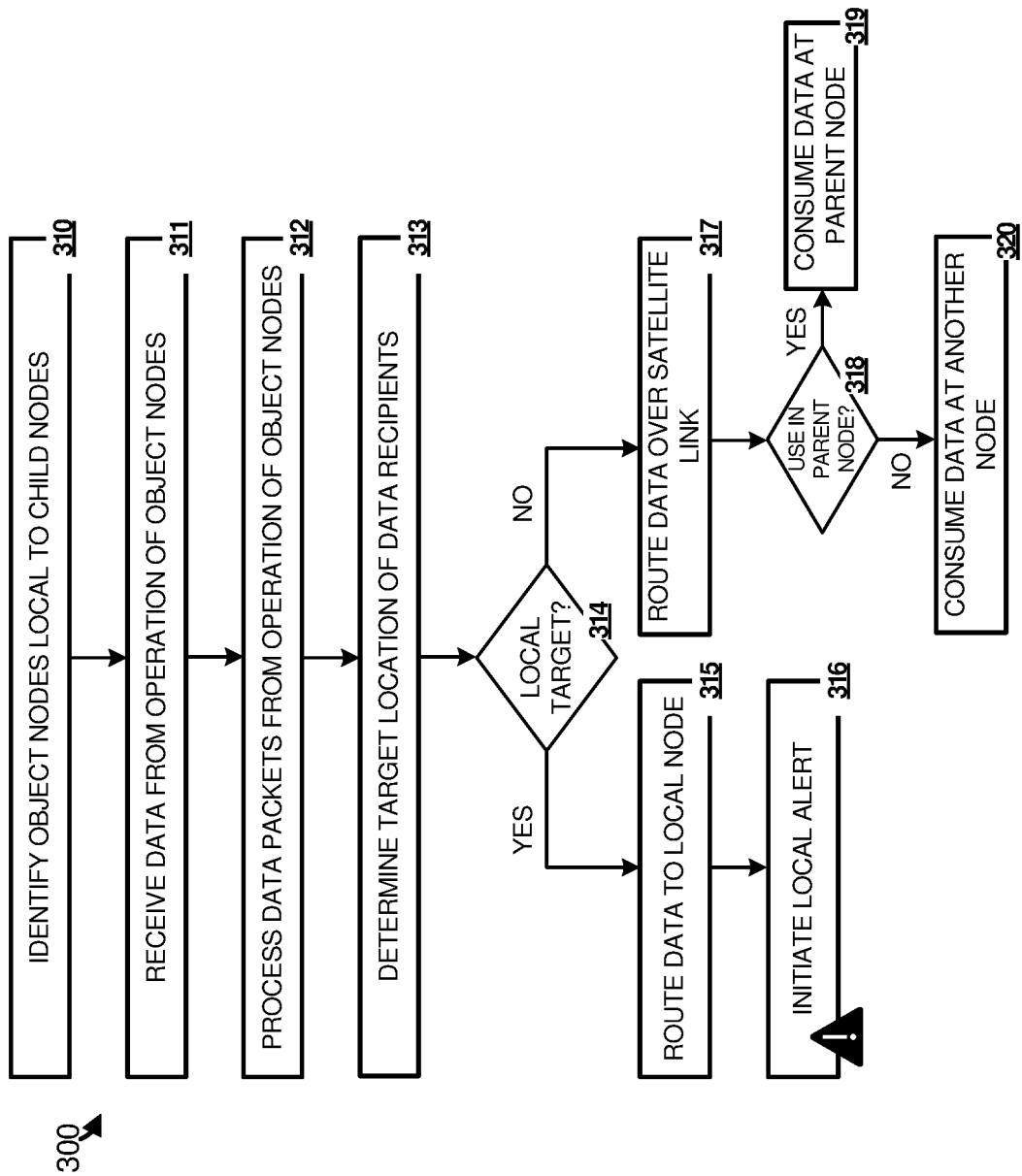
FIG. 3 illustrates example operations for a communication system according to an implementation.

Turning now to further example operations 300 for the elements of FIG. 1, a method of operation is presented in FIG. 3. The operations in FIG. 3 relate to operation of child nodes with respect to a parent node and handling of data generated by object nodes coupled to child nodes. In FIG. 3, operations are discussed in the context of child node 120, but it should be understood that other child nodes might instead be employed.

Child node 120 identifies (310) object nodes local to child node 120. These object nodes can include various sensors, sensor devices, telemetry devices, Internet of Things (IoT) devices, control equipment, user devices, user equipment, displays, or other devices, which might be associated with other users or separate networks, comprising similar equipment as above. Object nodes 121-123 are included in FIG. 1 and coupled over one or more links represented by link 124. Child node 120 receives (311) data from operation of object nodes 121-123, such as telemetry data, sensor data, IoT data, and the like. This data might be included in one or more data packets or data portions that arrive in child node 120 according to the protocol and link properties of link 124. For example, if link 124 comprises a wireless link, then the data packets can be received over a wireless communication interface. Likewise, if link 124 comprises a wired link such as Ethernet, then the data packets might be received over a network interface.

Responsive to receiving the data packets, child node 120 processes (312) the data packets, such as by inspecting properties of headers or payloads. From this inspection, child node 120 determines (313) target locations of data recipients for the data packets. When local sensors or telemetry devices are employed, such as IoT devices, then data related to operation of the IoT devices might be consumed locally by the child node or transferred by the IoT devices to a data consumer node comprising a recipient node or collection node. However, this data consumer node might be located remotely from child node 120 or might be located in a similar location as child node 120. In other examples, the data might be transferred to parent node 110 for storage, processing, or other handling by parent node 110. Child node 120 performs a determination process on the data packets to determine if the data packets should be routed to a local target or a remote target (314). If a local target is identified for the data packets, then child node 120 routes (315) the data packets to a local node for initiation of a local alert (316). This local alert can be related to operations of the sensors or telemetry devices coupled to child node 120.

If a remote target is identified for the data packets, then child node 120 routes (317) the data packets over a satellite communication link to parent node 110. Parent node 110 might further route the data packets for delivery to an destination node that consumes (320) the data comprising a data 'consumer' node. This data consumer node might be a collection node or recipient node operated by parent node 110, might be a further child node, or might comprise yet a further node coupled over packet communication system 160. When the data packets are for use in parent node 110 (318), then parent node 110 can consume (319) the data packets or data carried by the data packets. The consumption of the data in parent node 110 refers to storing the data or the data packets, processing the data or the data packets, or otherwise operating on the data or the data packets. In one example, parent node 110 might host an application which consumes the data of the data packets. In another example, parent node 110 might cache or store the data packets for a period of time before forwarding the data packets to a data consumer node when conditions warrant. These conditions can include government regulation, bandwidth, or power constraints of further communication links, time of day or day of the week, or to await further data portions from one or more child nodes. Parent node 110 might collect data packets until a threshold amount of data has been received before forwarding the data to a data consumer node. Parent node 110 might further cache data for delivery to other child nodes, such as when parent node caches content that a first child node has provided for use by other child nodes.

In one example, child node 120 is configured to provide data related to operation of one or more local telemetry devices over SEN 102 for receipt by parent node 110, where SEN 102 comprises one or more satellite communication links shown in FIG. 1. Parent node 110 is configured to parse traffic received from child node 120 and route at least a portion of the data related to the operation of the one or more local devices that source telemetry to at least one additional child node coupled to SEN 102 over an additional satellite communication pathway. For example, the additional child node might comprise child node 130, and child node 130 can couple to SEN 102 over a corresponding satellite communication link. Telemetry data or sensor data that originates at child node 120 or a location of child node 120 can be routed by parent node 110 over one or more satellite communication links for delivery to child node 130. A user or operator at child node 130 can be alerted to the telemetry data or sensor data. Child node 130 might have one or more applications deployed thereto which consume (317) the telemetry data or sensor data originated by object nodes at child node 120. Thus, parent node 110 can facilitate transfer of the data originated at child node 120 to another child node executing data which employs such data in one or more applications. These applications might be executed by child node 130 or by one or more object nodes coupled to child node 130, and comprise monitoring applications, factory automation applications, agriculture operations applications, mining operations applications, electrical power generation and distribution applications, residential connection applications, or any other industrial, military, or commercial application which employs sensor/telemetry data generated at a first location and first child node for consumption at a second location and second child node. The network arrangement established by parent node 110 over the corresponding satellite communication links can further enable such operations among object nodes and child nodes.

In a further example, data generated at child node 120 might be addressed for transfer to child node 130 or an object node at child node 130 or over packet communication system 160. However, the data might be related to sensors or telemetry devices local to child node 120. An operator nearby child node 120 might desire to be notified of certain issues related to the data, even if an application is still configured to monitor/consume the data at another location. Child node 120 or parent node 110 can parse traffic that carries this data and determine if a local operator or operator device coupled to child node 120 should be alerted, as in operation 315. An operator local to child node 120 can thus be deployed to respond to problems, sensor data anomalies, failures, out-of-bounds conditions, or other alert conditions at a location of child node 120 without the data having to be delayed by transfer to another remote node and associated remote alerts dispatched to the location of child node 120. In such examples, an on-site technician can be alerted locally to problems or issues worthy of inspection or maintenance as indicated by locally generated data while the same data is transferred to a collection or monitoring node remote from the locality. A copy or mirror of the data might be produced by child node 120 or parent node 110 to support this bifurcated transfer scheme. Headers of traffic or metadata associated with traffic generated by sensors or telemetry devices might be monitored by child node 120 or parent node 110 for detection of relevant traffic that should be routed for local alerts. These headers might include flags or indicators related to status or alert presence, as well as network addresses or other identifiers which can identify the sensor or telemetry device that generated the data.

Figure 9:
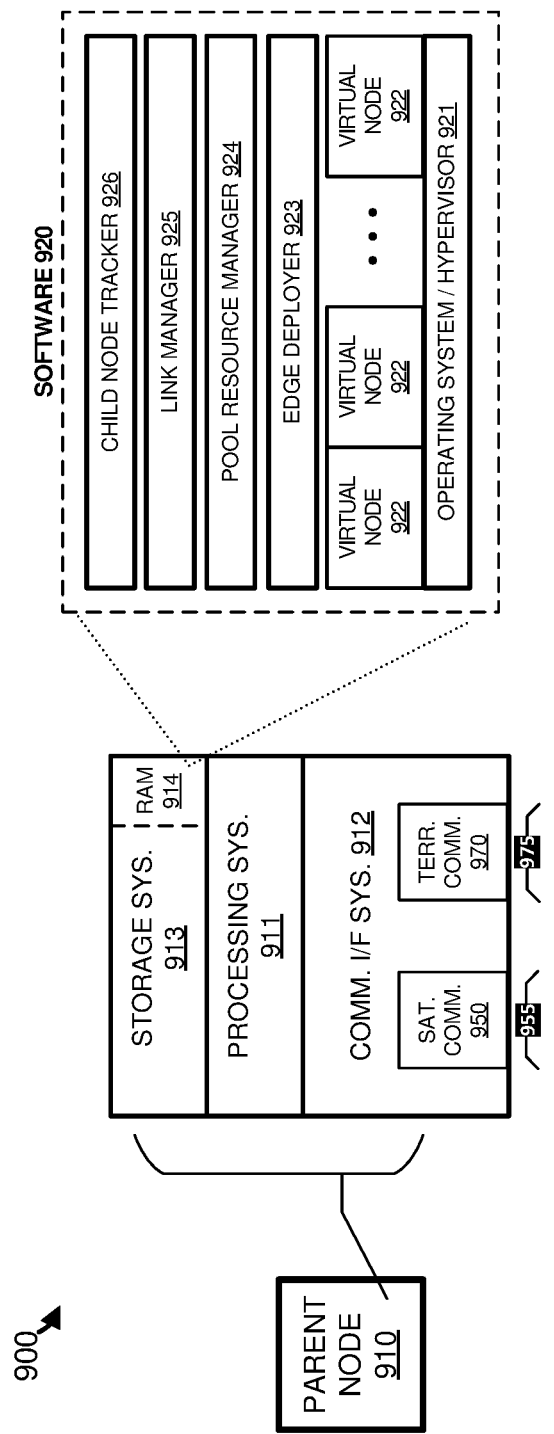
FIG. 9 illustrates a parent node according to an implementation.

Returning to the elements of FIG. 1, parent node 110 includes link manager 111 and policy engine 112. Parent node 110 also comprises one or more computing systems comprising one or more processing devices, storage devices, and communication interfaces (such as satellite communication interface 180). Further examples of parent node 110 are illustrated in FIG. 9. In some examples, parent node 110 comprises one or more user terminals such as Very Small Aperture Terminals (VSAT) devices, electronically steered terminal devices, hybrid terminal devices, or other terminal devices and types (also referred to herein as edge antennas) configured to communicate with one or more satellite communication service providers. A first communication interface 180 of parent node 110 can include a satellite communication interface configured to communicate over one or more satellite communication links, such as links 175-176. A second communication interface of parent node 110 can include a terrestrial communication interface which might comprise a network interface, wireless communication interface, wired communication interface, or optical communication interface configured to communicate over one or more packet links, such as communication link 170. In some examples, parent node 110 comprises network router, bridge, and firewall circuitry or elements. The various communication interfaces can include transceivers, RF circuitry, antenna elements, upconverters, downconverters, amplifiers, mixers, multiplexers, demultiplexers, connectors, and other similar communication equipment. Parent node 110 includes circuitry and processing elements to operate as discussed herein, such as discovering and managing child nodes, managing satellite link properties and connections, managing pools of resources found at child nodes, deploying applications to child nodes, selectively routing telemetry or sensor data generated at child nodes, and deploying data or applications to child nodes for edge caching, among other operations.

Figure 10:
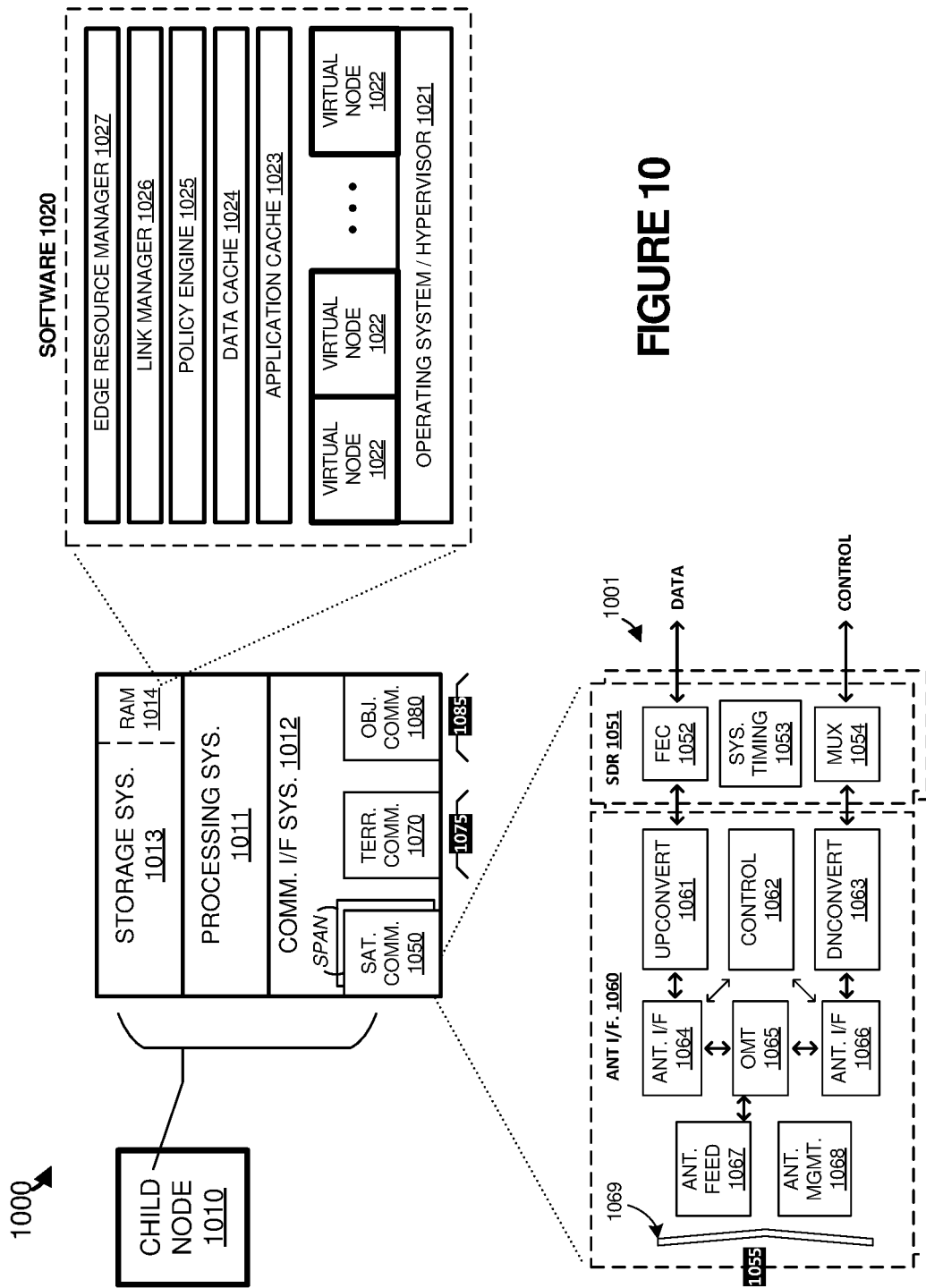
FIG. 10 illustrates a child node according to an implementation.

Child nodes 120, 130, 140 can each comprise a link manager, policy engine, and one or more applications. Child node 120 is shown in FIG. 1 as including exemplary link manager 125, policy engine 126, and applications 127. Further configurations of child nodes are shown in FIG. 10.

Child nodes 120, 130, 140 also comprise one or more computing systems comprising one or more processing devices, storage devices, and communication interfaces (such as satellite communication interfaces 180-182). In some examples, child nodes 120, 130, 140 might comprise one or more edge antenna devices configured to communicate over one or more satellite communication service providers. Child nodes 120, 130, 140 each comprise at least one satellite communication interface 180-182, and many examples include more than one instance of a satellite communication interface to support concurrent communication over more than one satellite communication link and with more than one satellite communication services provider. Each child node also includes one or more other communication interfaces for communication with object nodes. A first communication interface of child nodes 120, 130, 140 can include a satellite communication interface configured to communicate over one or more satellite communication links, such as links 177-178. A second communication interface of child nodes 120, 130, 140 can include a terrestrial communication interface which might comprise a network interface, wireless communication interface, wired communication interface, or optical communication interface configured to communicate over one or more packet links, such as links 124, 134, and 144. In some examples, child nodes 120, 130, 140 comprise network router, bridge, and firewall circuitry or elements. The various communication interfaces can include transceivers, radio frequency (RF) circuitry, antenna elements, upconverters, downconverters, amplifiers, mixers, multiplexers, demultiplexers, connectors, and other similar communication equipment.

Child nodes 120, 130, 140 each include circuitry and processing elements to operate as discussed herein, such as communicating with a parent node in a network arrangement, managing link properties and connectivity properties, monitoring link status or connectivity status, monitoring application requirements, caching data or applications for use by other child nodes, executing locally deployed applications, storing data for locally executed applications or for coupled object nodes, communicating with object nodes and managing traffic generated by object nodes, among other operations. As discussed above, any of child nodes 120, 130, or 140 might take over at least a portion of the role or functionality of parent node 110. In such instances, child nodes 120, 130, or 140 might comprise circuitry, software, features, or elements to provide for at least the portion of parent node 110.

Object nodes 121-123, 131-133, 141-143 each comprise processing circuitry, memory and storage elements, and one or more communication interfaces. Object nodes 121-123, 131-133, 141-143 might comprise telemetry gathering devices or systems that sense or gather data related to particular pieces of monitored equipment, machines, or nearby environments. Object nodes 121-123, 131-133, 141-143 might comprise sensor devices, data observation nodes, user equipment, user devices, or other equipment. Object nodes 121-123, 131-133, 141-143 can include sensors, such as motion sensors, imaging sensors, heat sensors, thermal sensors, thermostats, electromagnetic spectrum sensors, power sensors, electrical current sensors, laser sensors, proximity sensors, seismic sensors, meteorological sensors, chemical sensors, nuclear radiation sensors, pressure sensors, material or fluid flow rate sensors, speed or rotation sensors, accelerometer sensors, magnetometer sensors, barometer sensors, or other sensors, including combinations thereof. Object nodes 121-123, 131-133, 141-143 might comprise user equipment or user devices, such as smartphones, tablet computers, laptop computers, desktop computers, gaming console, or other computing and communication devices, whether stationary or mobile. In some examples, object nodes 121-123, 131-133, 141-143 comprise IoT devices, each with a particular duty or function which can communicate over a communication interface with a child node. Object nodes 121-123, 131-133, 141-143 might comprise circuitry and equipment to receive signals corresponding to one or more position, navigation, and timing (PNT) systems such as global navigation satellite system (GNSS) systems, including Global Positioning System (GPS), Global Navigation Satellite System (GLONASS), BeiDou Navigation Satellite System (BDS), or Galileo system, among others including PNT-enhancing systems such as European Geostationary Navigation Overlay Service (EGNOS) or Wide Area Augmentation System (WAAS).

Object nodes 121-123, 131-133, 141-143 communicate over object communication links 124, 134, 144. Links 124, 134, 144 can use metal, glass, optical, air, space, or some other material as the transport media. Links 124, 134, 144 can use various communication interfaces and protocols, such as Internet Protocol (IP) versions 4 or 6, Ethernet, universal serial bus (USB), Wireless USB, Thunderbolt, Bluetooth, IEEE 802.11 (WiFi), WiMAX (Worldwide Interoperability for Microwave Access), microwave RF communications, High Frequency (HF), Very High Frequency (VHF) communications, ultra high frequency (UHF) communications, low-power wide-area network (LPWAN), LoRa (Long Range), low-rate wireless personal area networks (LR-WPANs), IEEE 802.15.4 (Zigbee, among others), Near-field communication (NFC), Infrared Data Association (IrDA), or other communication signaling or communication formats, including combinations, improvements, or variations thereof. Links 124, 134, 144 can be direct links or may include intermediate networks, systems, or devices, and can include a logical network link transported over multiple physical links.

Links 184-185 are included in FIG. 1 to show optional child-to-child communication links. Links 184-185 might comprise wired or wireless links, RF or optical links, or other link configurations described above for any of links 175-178 and 124, 134, and 144, among other link types. For example, links 184-185 might comprise cellular or wireless links that couple child nodes over a cellular communication system or custom-deployed wireless network. In other examples, wired or hybrid wired-wireless communication links are employed which comprise one or more packet networks. When links 184-184 are included, then the associated child nodes can include communication interfaces to support such links, which might include further transceivers, network interface cards, optical communication equipment, and the like. In further examples, links 184-185 might comprise logical or virtual links transported over one or more satellite communication links to form a communication connection between corresponding child nodes. These logical or virtual links employ portions of satellite devices or parent node 110 to route traffic from one child node to another child node. Virtual private network (VPN) or tunneling arrangements can also be employed to form links 184-185.

Orbital satellite groups 150-151 each comprise separate collections or constellations of one or more satellite devices deployed into orbits and design configurations about a central mass, such as the Earth, a human-made orbiting object such as a space station, other satellites in a swarm configuration, an orbital lunar outpost, or other celestial objects or planets. Satellite devices of each orbital satellite group might share a common orbit or orbital configuration, which might form planes, rings, or other arrangements. Each orbital satellite group might correspond to a single communication services provider, satellite operator, government entity/operator, private or public company, or other organization/entity which employs a particular communication frequency or set of frequencies for satellite devices of that particular orbital satellite group. Orbital satellite group 150 includes satellite devices 152-153, and orbital satellite group 151 includes satellite devices 154-155. Satellite devices 152-155 can comprise various hardware and software elements included in an orbital package. Satellite devices 152-155 can comprise communication equipment, processing equipment, and control/logistical elements including structures, mechanisms, propulsion, attitude control, power generation and management, and thermal management elements. Satellite devices 152-155 include communication equipment and antenna elements to communicate with one or more ground devices and/or other satellites, such as shown for parent node 110 and child nodes 120, 130, and 140. The antenna elements might be omni-directional, directional, or orientable according to locations of surface or airborne devices, such as using gimbal mounts, servos, phased arrays, or other features. Inter-satellite communications might occur using RF or optical communications. Satellite devices 152-155 can be deployed into various orbits, each corresponding to a particular orbital configuration. Although exact definitions can vary, low-earth orbits (LEO) typically comprise orbital altitudes of 2,000 kilometers (km) or less, and medium-earth orbits (MEO) typically comprise orbital altitudes of 2,000 km up to geosynchronous (GSO) orbital altitudes of 35,786 km. A geostationary orbit is a special case of a GSO corresponding to a geosynchronous orbit about the equator (e.g. at zero degrees inclination), and can be referred to as a geosynchronous equatorial orbit (GEO). Non-geosynchronous (NGSO) orbits can include those not defined as GSO or GEO. Other example orbits include High Earth Orbits and critically-inclined orbits. These specific definitions of orbital altitudes can vary based on the particular defining entity and deployed configuration. Other orbital configurations are possible, which might have various inclinations and altitudes, such as equatorial and polar orbits. Although the term "geo" is typically assigned to Earth-centric orbits, it should be understood that the orbital configurations and definitions herein might instead be applied to other bodies, such various planets, moons (e.g. lunar-centric), and sun/stars (e.g. helio-centric).

Satellite communication links 175-178 each comprise a particular set of parameters that may include center frequency, bandwidth, power setting, channel, channel set, frequency, frequency set, center frequency, or frequency spread, among others. While implementations of satellite communication links 175-178 are not limited to a particular frequency range, some implementations may utilize a frequency range corresponding to the Institute of Electrical and Electronics Engineers (IEEE) bands of L band, S band, C band, X band, Ku band, Ka band, V band, W band, among others, including combinations thereof. Other example communication frequency ranges and service types include ultra-high frequency (UHF), super high frequency (SHF), extremely high frequency (EHF), or other parameters defined by different organizations such as broadcast satellite service (B S S), fixed-satellite service (FSS), mobile-satellite service (MSS) or similar services for communications.

In addition to satellite-to-ground links shown for links 175-178, additional satellite-to-satellite links might be included. These links are represented by link 179 in FIG. 1 and can include communication links between satellites of the same orbital satellite group or among different orbital satellite groups. Moreover, various constellations or swarm patterns or arrangements of satellites can be formed, and these arrangements can have various communication topologies for transferring communications between satellites. In-plane and cross-plane communications can be provided when satellites are arranged into groupings comprising orbital rings or planes. Link 179 can comprise any of the links described herein for links 175-178, which might include RF, optical, laser, or other similar communication links, among others.

Packet communication system 160 comprises one or more packet networks configured to route packet communications between endpoints over network links. Packet communication system 160 can include routers, bridges, switches, management systems, network links, and other network routing and handling equipment, including combinations thereof. In some examples, packet communication system 160 comprises one or more long-haul communication service providers that route packet communications over network links between local internet service providers (ISPs) that provide last-mile services to end users or data centers.

Data services 161-162 each comprises server based or distributed computing based data services and platforms, such as database services, messaging services, application services, or control system services, among others. Data services 161-162 can each include communication interfaces, network interfaces, processing systems, computer systems, microprocessors, storage systems, storage media, or some other processing devices or software systems, and can be distributed among multiple devices or across multiple geographic locations. Examples of data services 161-162 can each include software such as an operating system, logs, databases, utilities, drivers, networking software, and other software stored on a computer-readable medium. Data services 161-162 can each comprise one or more platforms which are hosted by a distributed computing system or cloud-computing service. Data services 161-162 can each comprise logical interface elements, such as software defined interfaces and Application Programming Interfaces (APIs). Data services 161-162 can each include one or more user interfaces, such as graphical user interfaces, web interfaces, APIs, terminal interfaces, console interfaces, command-line shell interfaces, extensible markup language (XML) interfaces, among others.

Communication links 170-172 can each represent one or more communication links, such as one or more network links comprising wireless or wired network links. Communication links 170-172 can comprise various logical, physical, or application programming interfaces. Example communication links can use metal, glass, optical, air, space, or some other material as the transport media. Communication links 170-172 can use various communication protocols, such as Internet Protocol (IP), Ethernet, hybrid fiber-coax (HFC), synchronous optical networking (SONET), asynchronous transfer mode (ATM), Time Division Multiplex (TDM), Long-Term Evolution (LTE), 3rd Generation Partnership Project (3GPP)-defined protocols, 5G or 5G NR (New Radio) communications, circuit-switched, communication signaling, wireless communications, or some other communication format, including combinations, improvements, derivatives, or variations thereof. Communication links 170-172 can include direct links or may include intermediate networks, systems, or devices, and can include a logical network link transported over multiple physical links. Communication links 170-172 can include routers, switches, bridges, traffic handling nodes, and the like for transporting traffic among endpoints.

Figure 4:
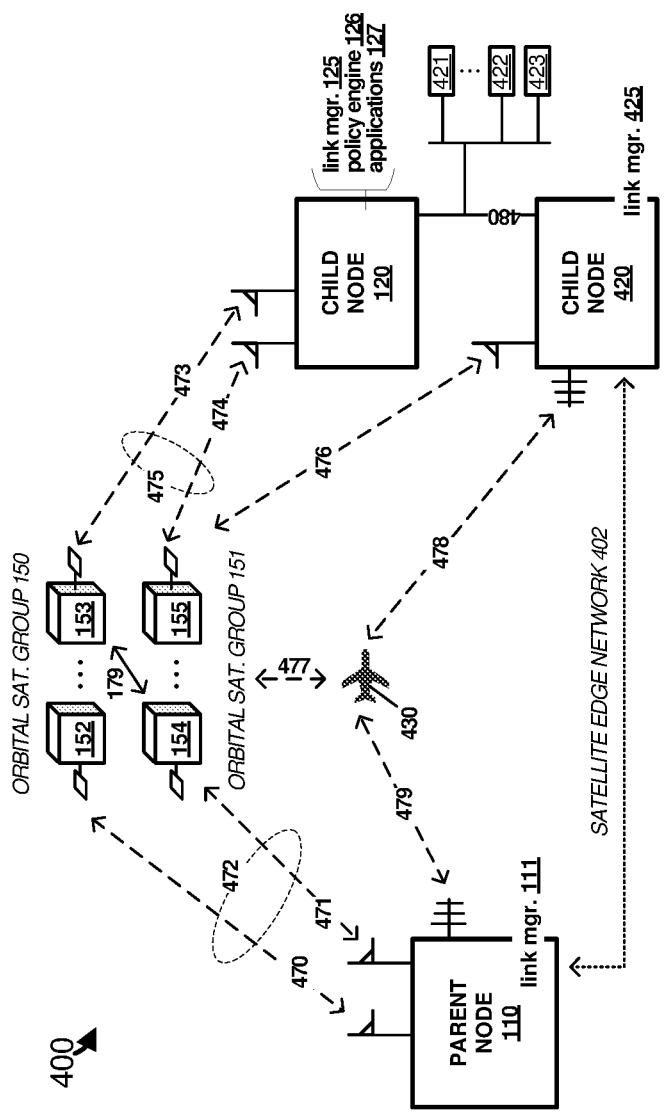
FIG. 4 illustrates a communication environment according to an implementation.

FIG. 4 illustrates communication environment 400 according to an implementation. In FIG. 4, several elements found in FIG. 1 are included, along with additional elements used to illustrate further example implementations. However, it should be understood that the examples in FIG. 4 are not limited to the elements found in FIG. 1. FIG. 4 illustrates various communication pathways for child nodes and parent nodes to form and communicate over satellite edge network (SEN) 402. Communications between child nodes and parent nodes might be routed over any of the various links or pathways discussed in FIG. 4. FIG. 4 includes parent node 110, child nodes 120 and 420, airborne node 430, and two orbital satellite groups 150-151. Airborne node 430 comprises one or more airborne or atmospheric nodes, such as aircraft, airplanes, drones, unmanned aerial vehicles (UAVs), balloons, or other similar airborne vehicles, can be tethered/stationary or mobile. Child nodes 120 and 420 are communicatively coupled via terrestrial communication link 480, which also communicatively couples a plurality of object nodes 421-423.

Parent node 110 can communicate with orbital satellite group 150 over satellite communication link 470 and communicate with orbital satellite group 151 over satellite communication link 471. In some examples, parent node 110 uses only one link among links 470 and 471 for communications. In other examples, parent node 110 can communicate over both links 470 and 471 concurrently, or merge both links 470 and 471 into aggregated communication pathway 472. Child node 120 can communicate with orbital satellite group 150 over satellite communication link 473 and communicate with orbital satellite group 151 over satellite communication link 474. In some examples, child node 120 uses only one link among links 473 and 474 for communications. In other examples, child node 120 can communicate over both links 474 and 475 concurrently, or merge both links 474 and 475 into aggregated communication pathway 475. Child node 420 can communicate with either orbital satellite group 150 or orbital satellite group 151 over satellite communication link 476. Child node 420 can also communicate with one or more airborne nodes, such as airborne node 430, over communication link 478. Airborne node 430 can communicate with child node 420 over communication link 478 and can communicate with either orbital satellite group 150 or orbital satellite group 151 over satellite communication link 477. Airborne node 430 can optionally communicate with parent node 110 over communication link 479.

Satellite communication links 471-477 each comprise communication links similar to those discussed above for satellite communication links 175-178, although variations are possible. Terrestrial communication link 480 comprises one or more links similar to that discussed above for communication links 124, 134, 144, although variations are possible. Communication links 478-479 comprise wireless RF links or optical links. Examples of links 478-479 include WiFi, WiMAX, microwave RF communications, High Frequency (HF), VHF, or UHF communications links, including combinations thereof.

In operation, parent node 110 establishes a network arrangement that includes communication nodes comprising parent node 110, child node 120, and child node 420. This network arrangement is represented by satellite edge network (SEN) 402 in FIG. 4, which may be similar to SEN 102 in FIG. 1 in some examples. In FIG. 4, parent node 110 is configured to establish SEN 402 over at least a satellite communication pathway with one or more child nodes remotely located from a geographic location of parent node 110. Parent node 110 establishes SEN 402 by at least establishing a network transport layer for the child node over one or more link layers provided by the satellite communication pathways. The network transport layer can comprise a virtual transport layer or transport layer formed over a transport layer or layers of the various satellite communication links coupling parent node 110 to the child nodes. SEN 402 comprises a network transport layer separate from or in addition to any provided by satellite communication service providers. SEN 402 is thus formed over one or more of the various satellite communication links included in FIG. 4. SEN 402 can span over one or more satellite communication links, one or more satellite groups or satellite communication service providers, and one or more child nodes. To couple into SEN 402, each communication node employs an associated satellite communication link or satellite communication link in combination with one or more airborne communication links. However, each individual satellite communication link might experience various changes in link properties or link status over time. Parent node 110 maintains SEN 402 over various changes in link properties or link pathway. SEN 402 tolerates changes in link properties or link pathways while maintaining the network arrangement. Thus, a fault-tolerant and link-independent network arrangement is employed in FIG. 4. For example, parent node 110 is configured to maintain SEN 402 with the child nodes after at least one of the child nodes changes from communicating over a first satellite communication pathway provided by a first satellite communication service provider to communicating over a second satellite communication pathway provided by a second satellite communication service provider. Specifically, child node 120 might initially communicate over link 473 via orbital satellite group 150 and change to communicate over link 474 via orbital satellite group 151. Alternatively, child node 120 might initially communicate over link 473 via orbital satellite group 150 and change to communicate over a merged or aggregated pathway that comprises both link 474 and link 474. Similar operation can occur for parent node 110 with respect to links 470-472 and 479, or with child node 420 with respect to links 476 and 478.

SEN 402 can be configured to support network packet routing, network packet transfer, and network packet handling over the various links shown in FIG. 4 as if parent node 110, child node 120, and child node 420 were all on a locally-connected network that shares a transport layer. To provide such an arrangement, various network transport protocols can be employed, such as encrypted layered tunneling protocols or virtual private networks (VPNs). Example transport protocols include Internet Protocol Security (IPsec), Transport Layer Security (SSL/TLS), virtual LANs (VLANs), IEEE 802.1Q, Pseudo Wire (PW), Point-to-Point Tunneling Protocol (PPTP), or Virtual Private LAN Service (VPLS), among others. In some examples, the aforementioned network transport protocols might be modified or enhanced to support satellite communication links or links of airborne nodes, as well as changes to properties or pathways of the underlying physical links.

Turning now to one example operation for the elements of FIG. 4, child node 420 might initially communicate over SEN 402 using satellite communication link 476, orbital satellite group 151, and link 471. However, due to changes in the properties of link 476 or changes in requirements of one or more applications executed at child node 420, child node 420 might be triggered to change link properties or link pathways. Changes in the link properties might include any of the aforementioned link property changes, such as fading or loss in signal quality for link 476. Other examples include jamming conditions, which may be passive, active, intentional, or unintentional. The examples can also include movement of one or more satellite devices of orbital satellite group 151 to prevent continued communication over link 476. The link properties might be monitored by link manager 425 of child node 420 and identify the changes or triggers. Responsive to these changes or triggers, link manager 425 can initiate one or more alternative communication pathways to reach parent node 110 and remain communicating on SEN 402. A first example alternative communication pathway includes link 480 which couples child node 420 to child node 120. In this first alternative, traffic can be routed over link 480 to child node 120 which can responsively route this traffic over any associated link from which child node 120 couples into SEN 402. A second example alternative communication pathway includes link 478 which is established with airborne node 430. Airborne node 430 has connectivity to SEN 402 over satellite communication link 477 which might be provided by orbital satellite group 150 or 151. In this second alternative, traffic can be routed over link 478, airborne node 430, and link 477 to reach an orbital satellite group with which parent node 110 presently has connectivity. A third example alternative communication pathway includes links 478-479 which are established by airborne node 430. Airborne node 430 has connectivity to parent node 110 over communication link 479. In this third alternative, traffic can be routed over link 478, airborne node 430, and link 479 to reach parent node 110 presently has connectivity. One or more further airborne or terrestrial nodes and links can be included to reach parent node 110 or child node 420. Thus, in these examples, child node 420 can maintain presence within SEN 402 even if the various communication pathways change. The network transport layer arrangement employed by parent node 110 to establish SEN 402 can be altered with each change in communication pathway to allow for traffic to be correctly routed to the associated endpoints. This can include updating network addressing, network routes, or virtual LAN properties to reflect the new communication pathways.

Turning now to another example operation for the elements of FIG. 4, application requirements of one or more of the applications 127 deployed to child node 120 might request additional communication bandwidth or additional communication quality/reliability. Also, one or more object nodes 421-423 might request additional communication bandwidth or additional communication quality/reliability. Policy engine 126 of child node 120 can identify these requests and associated bandwidth requirements. Once identified, policy engine 126 can trigger changes to one or more among links 473-474 to support the bandwidth requests. In one instance, child node 120 is initially communicating over satellite communication link 473 and link 474 is idle or not presently established. In another instance, child node 120 is initially communicating over satellite communication link 474 and link 473 is idle or not presently established. To add the additional bandwidth, link manager 125 can change link properties of one or more active links, or add additional links for traffic. The changes in link properties can include increasing a transfer rate of the link, changing link frequencies, changing a transmit power, changing link bonding configurations, selecting a different satellite device which has a higher quality link potential, changing satellite communication services provider to one which has a higher quality link potential, altering a data or signal compression scheme, or altering a communication coding scheme to allow for additional bandwidth for user traffic (such as to reduce a quantity of accompanying error correction traffic), among other changes, including combinations thereof. Alternatively, link manager 125 can add one or more additional satellite communication links to increase a communication bandwidth. This is shown in FIG. 4 as creating an aggregated or merged link 475. The aggregation of the bandwidth of links 473-474 into link 472 can occur at various points in a network stack. In one example, a transport layer or higher layer is employed to aggregate bandwidth of two or more links. In another example, such as shown below in FIG. 5, an additional layer between a link layer and transport layer is employed to aggregate bandwidth of two or more links. The aforementioned changes to link properties or link quantities can also be applied to the operation of parent node 110 with regard to links 470-472.

Advantageously, the arrangement shown in FIG. 4 provides for enhanced network connectivity and network flexibility for object nodes 421-423 to transfer and receive traffic with regard to parent node 110 over SEN 402. Various link pathway changes and link property changes can occur while maintaining network connectivity within SEN 402 for parent node 110, child node 120, child node 420, and object nodes 421-423. Moreover, selection among various satellite communication service providers can be made on-the-fly to best suit the communication needs or requests of one or more applications or object nodes.

FIG. 5 illustrates protocol stack arrangement 501 according to an implementation. Communication layers 510-519 might be employed in a network arrangement that forms at least portions of SEN 102 or SEN 402. Also included in FIG. 5 is traffic management 502 and bandwidth aggregation example 503.

A first layer (L1) in the protocol stack comprises two physical layers (phy1, phy2) each associated with a separate physical media, such as separate satellite communication links. If more than two concurrent links are employed, then further corresponding physical layers can be included at L1. At L1, each physical layer 510-511 is separate and corresponds to a physical pathway used to communicate data bits over a link with a satellite device. The physical layer can include RF or optical transmissions using various amplitude, power, coding, frequency, channel, and modulation properties.

A second layer (L2) includes one or more link layers (link1, link2) each associated with different satellite communication links. At L2 in arrangement 501, each link layer 512-513 is separate and corresponds to transmission of frames of data which can include some low-level retransmission or physical layer error handling. The frames associated with L2 include sender and receiver media access control (MAC) addresses, among other identifiers.

An intermediate layer (L2X) between L2 and L3 is included in FIG. 5. L2X layer 514 can optionally be employed by a communication node to aggregate bandwidth of the separate satellite communication links associated with physical layers 510-511 and link layers 512-513. In layer L2X, a bandwidth can be combined from among two satellite communication links which might be provided by different satellite communication service providers or different satellite devices. Functionality of layer L2X can include ordering of data frames received over more than one physical link, and merging of ordered data frames into an aggregate stream of data frames from more than one physical link, among other functionality. To provide this functionality, various circuitry or software can be included in a communication node that provides for combining communication bandwidth of two or more separate physical links into a single network layer or transport layer. This may include buffering of frames received over more than one physical link and inspection of frame headers or packet headers to determine ordering among the frames of the more than one physical links. In one example, a source communication node might form a stream of data frames which includes header fields or ordering indicators in addition to any of the frames to establish an ordering among the frames in the stream before transfer of the frames over different physical links. L2X can inspect these ordering indicators to order the frames received over separate physical links and merge the frames into a single stream of frames for use by higher layers in the protocol stack.

In one example, shown as bandwidth aggregation example 503, two separate physical links each have an associated center frequency or transmission frequency (F1, F2). Each link has an associated bandwidth (B1, B2) which corresponds to a quantity or rate of data able to be transferred over the link in ideal conditions. The amount of RF energy for each link is shown in example 503 as RF energy curves 531-532. When combining or aggregating the bandwidth for two links, an increased total bandwidth is shown (B3) which corresponds to RF energy curve 530. Thus, two RF links might coexist at a single communication node, as shown for the separate physical/link layers in protocol stack arrangement 501, and their combined bandwidth can be used to provide for enhanced execution and handling of applications deployed to the communication node. Other forms of link aggregation might be employed, such as aggregation at higher layers in protocol stack arrangement 501 using various logical or virtualized arrangements.

A third layer (L3) in the protocol stack comprises network layer 515, and is typically responsible for packet forwarding, routing, and packet addressing. One example L3 protocol includes the Internet Protocol (IP) which employs network addresses (IPv4 or IPv6) for data arranged into packets.

A fourth layer (L4) in the protocol stack comprises transport layer 516, and coordinates data transfer between system and hosts, performs error-checking, and performs some data recovery. One example L4 protocol includes transmission control protocol/user datagram protocol (TCP/UDP), which employs port numbers, sequence numbers, flow control for segments of data packets.

In FIG. 5, layers 5-7 can include standard network protocol features, as well as specialized and enhanced features shown in traffic management 502. A fifth layer (L5) in the protocol stack comprises session layer 517 that establishes and terminates connections between devices, and can perform segregation of packets into separate groups, such as files. A sixth layer (L6) in the protocol stack comprises presentation layer 518 that translates between data formatting employed by applications and data formatting used by the lower level networking protocols. A seventh layer (L7) in the protocol stack comprises application layer 519 which interfaces with user-level applications. However, in addition to the standard functionality discussed above, layers L5-L7 in FIG. 5 include additional functionality and virtualization features shown in traffic management 502.

Traffic management 502 includes several components which provide additional services at the L5-L7 layer to network data packets/frames with regard to user applications or data 520 which produce network workloads 522. A first set of components of traffic management 502 is network services 521. Network services provide various workload handling features including prioritization among workloads 522, carrier-grade (CG) network address translation (NAT) that provides sharing of groups of network addresses among many endpoints, network traffic filtering operations, wide-area network options, traffic/port firewalls, and other features for handling of network traffic with regard to network workloads 522. A second set of components of traffic management 502 is network virtualization 523. Network virtualization 523 handles creation and management of one or more virtual network arrangements 524. Virtual network arrangements 524 can include virtual private networks (VPNs), virtual local area networks (VLANs), virtual extensible LANs (VXLANs), or other virtualized network arrangements to support user applications or data 520 which may comprise one or more virtualized applications or distributed data as will be discussed below. A third set of components of traffic management 502 is management services 525. Management service 525 can manage any of the modules or features of traffic management 502, such as network services 521, network workloads 522, or network virtualization 523. Management services 525 includes manual or automatic deployment of any of the features of traffic management 502, orchestration of network resources and features of traffic management 502, and general management features related to traffic management 502.

Figure 6:
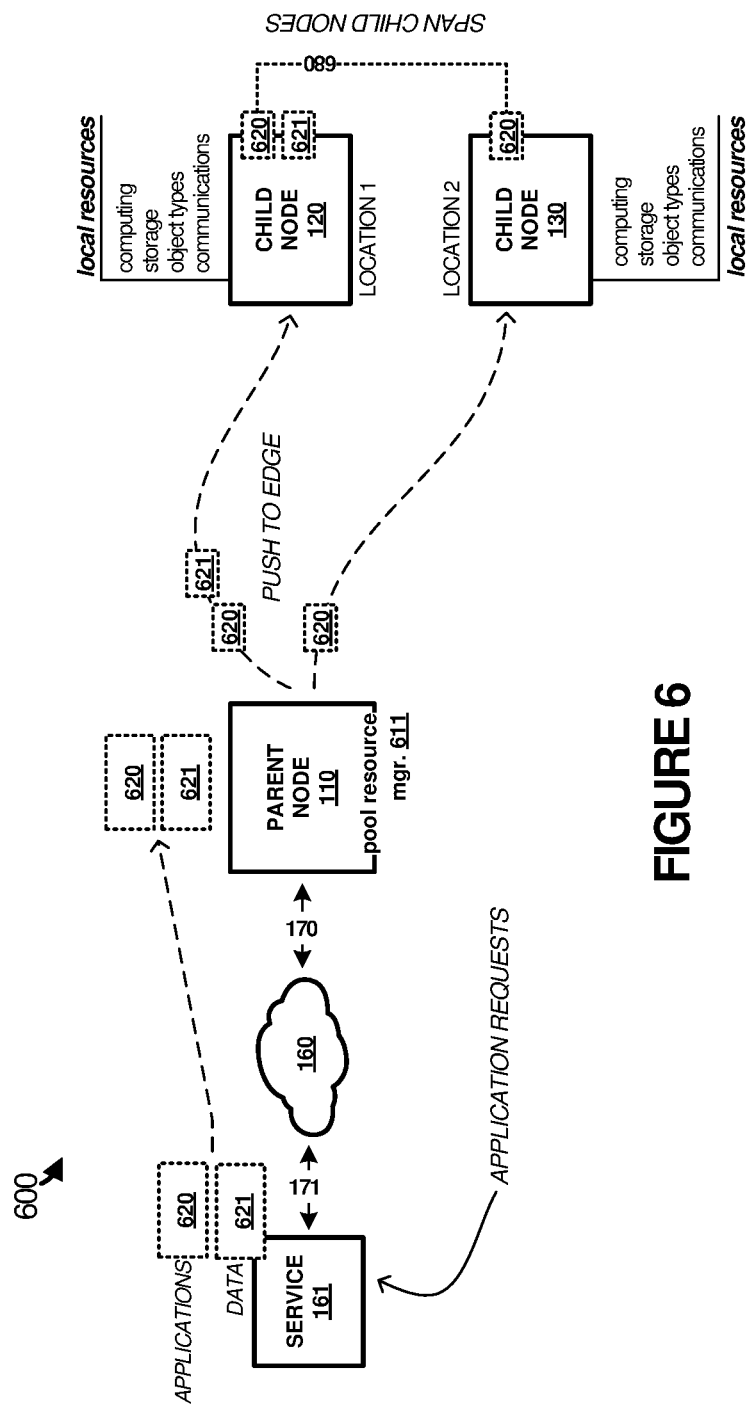
FIG. 6 illustrates a communication environment according to an implementation.

Turning now to several examples related to application deployment and child node management, FIG. 6 is presented. FIG. 6 illustrates communication environment 600 according to an implementation. Environment 600 includes parent node 110, child node 120, child node 130, packet communication system 160, and data service 161. Although not shown for clarity in FIG. 6, parent node 110 and child nodes 120 and 130 will typically have one or more communication links to handle communications between and among the nodes, such as the satellite communication links seen in FIG. 1, or variations thereof. Parent node 110 also communicates with packet communication system 160 over communication link 170. Data service 161 illustrates an example cloud computing, distributed data storage, or data handling service which may be employed by other elements of environment 600. Data service 161 communicates over communication link 171. In FIG. 6, several elements found in FIG. 1 are included, along with additional elements used to illustrate further example implementations. However, it should be understood that the examples in FIG. 6 are not limited to the elements found in FIG. 1.

In FIG. 6, parent node 110 is shown including pool resource manager 611. Pool resource manager 611 comprises circuitry or software which is configured to discover physical resources local to each child node, catalog such resources, and manage deployment of such resources. The physical resources can include processing resources or computing resources, as indicated by data processing capacity, data processor type and quantity, as well as current workload handled by the data processors. The data processors might include central processing units (CPUs), microprocessors, graphics processing units (GPUs), Tensor Processing Units (TPUs), deep-learning processors and circuitry, embedded processors, microcontrollers, and other types of data processing circuitry. The physical resources can include data storage resources, as indicated by data storage capacity (total or free space), as well as storage media type. Data storage resources might include hard disk drives (HDDs), solid state storage drives (SSDs), hybrid disk drives, optical storage drives, magnetic storage devices, or other storage media and devices. The physical resources can include communication resources or communication link resources, as indicated by communication interface types, quantities, and available bandwidths. The communication interfaces can be of the various types discussed herein, including RF communication interfaces, satellite communication interfaces, optical communication interfaces, local and remote communication interfaces, Ethernet or other local network interfaces, local wireless interfaces, and other communication interfaces. The physical resources can include object nodes, as indicated by object node types, object node devices, sensor types, telemetry resources, telemetry data availability, properties of the object nodes, communication bandwidth of the object nodes, telemetry bandwidth, sample frequency, or other features of the object nodes. Other physical resources can be discovered and cataloged by parent node 110 for each child node, and updates to the discovery and cataloging process can be performed on a cyclic or periodic basis, as well as in response to changes in configurations of the child nodes.

Figure 8A:
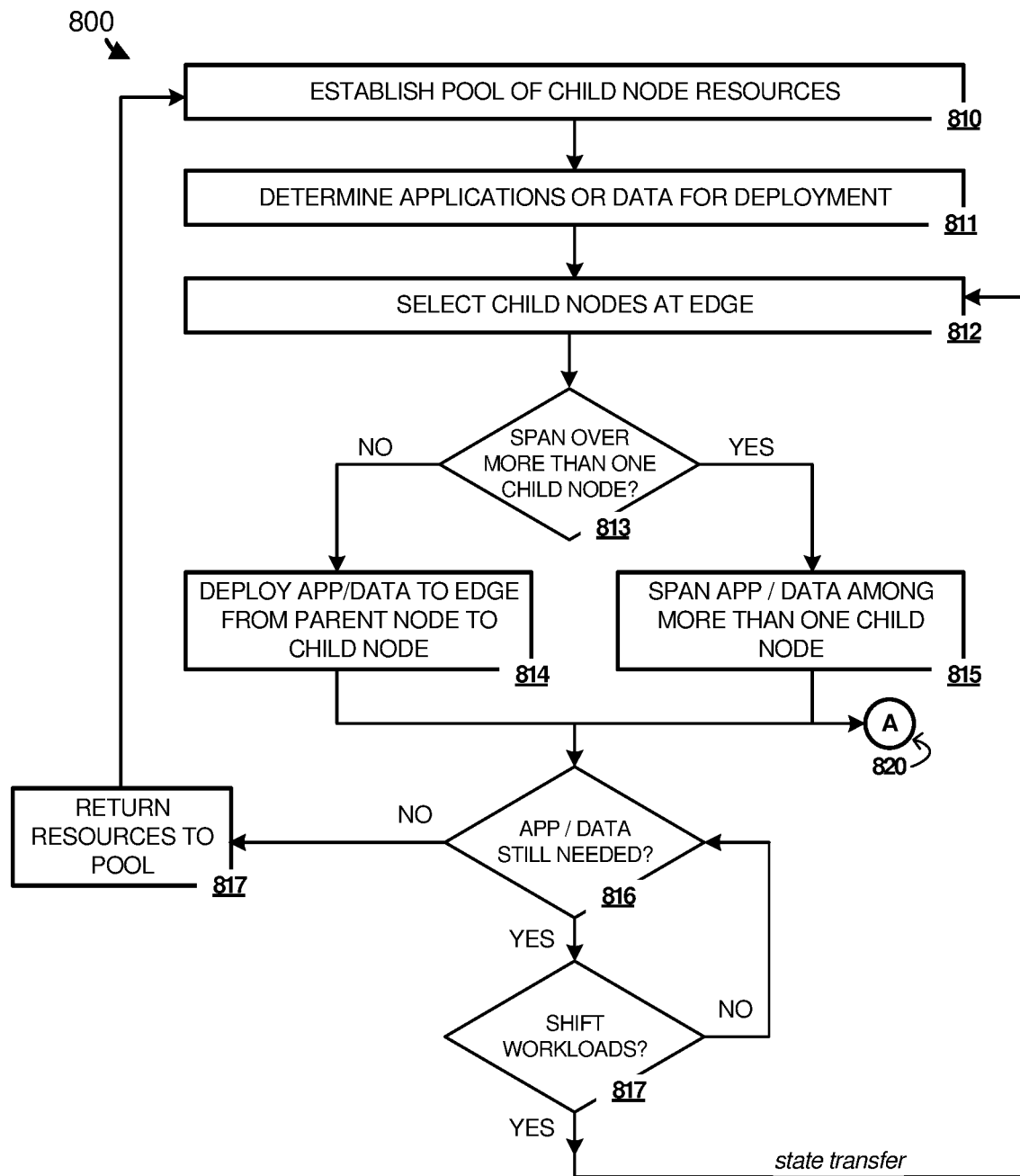
FIG. 8A illustrates example operations for a communication system according to an implementation.
Figure 8B:
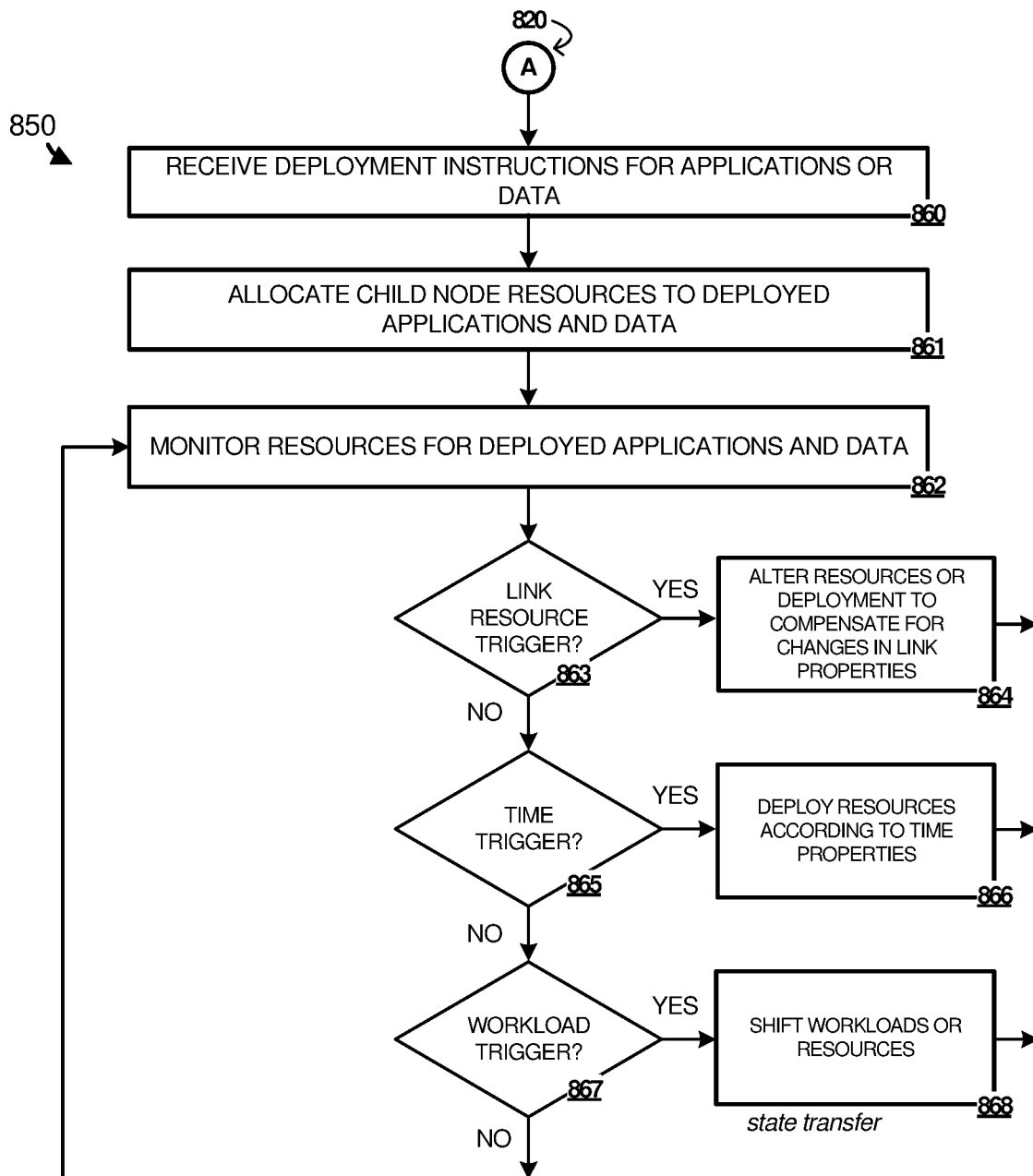
FIG. 8B illustrates example operations for a communication system according to an implementation.

Pool resource manager 611 can maintain one or more data structures with indications of the physical resources corresponding to each child node and current status of availability of the physical resources. Pool resource manager 611 might establish a pool of resources which can be employed for use in execution of various applications deployed to the child nodes. The pool of resources can comprise a pool of free or unused resources, and pool resource manager 611 can track resources which have been allocated or assigned from the free pool for use by activities of a child node. In operation, one or more users or operators may wish to deploy applications to one or more child nodes for use of the local physical resources of the child node or to employ one or more object nodes for various tasks. In addition, the child nodes themselves or devices coupled thereto may initiate activities which prompts execution of an application by a child node or retrieval of data by the child node. FIGS. 8A and 8B below discuss operations of these pools of resources in more detail.

However, deployment of the applications to child nodes can be briefly discussed in the context of FIG. 6. In FIG. 6, one or more application requests can be initiated by data service 161. Data service 161 may include one or more front-ends, user interfaces, or application programming interfaces (APIs) which allow users or operators to select and initiate applications for deployment to one or more child nodes. These applications may comprise various types of applications which employ the physical resources of target child nodes. Child nodes might be selected based on availability of physical resources, which may include both location-dependent physical resources, or selected based on which physical resources are free to perform activities of the applications. Location-dependent physical resources can include sensors, telemetry devices, or IoT devices which have a geographic location desirable to the user deploying the applications, such as sensors which sense a particular locality/area, telemetry devices for particular pieces of equipment, or IoT devices specific a location of the child node.

In a first example, one or more applications 620 may be requested for deployment by data service 161. Data service 161 may communicate with parent node 110 over links 170-171 and network 160 to indicate the request for deployment of applications 620. The request may be for a specifically indicated application or applications, or may instead be a requirements-based request that indicates particular sensor requirements, telemetry requirements, processing requirements, communication requirements, storage requirements, or other requirements. When the requests indicate specific applications for deployment, then pool resource manager 611 of parent node 110 can select one or more child nodes which shall receive deployed applications. When the requests indicate requirements, then pool resource manager 611 of parent node 110 can select among the child nodes based on availability of physical resources which meet or exceed the requirements. Parent node 110 can then deploy applications 620 over the associated LAN and satellite communication links to one or more child nodes for execution. In FIG. 6, applications 620 are received from data service 161, but other examples might have parent node 110 retrieve the applications from one or more storage systems instead. FIG. 6 shows two child nodes (120, 130) receiving applications 620. Thus, configuration 680 is shown in which applications 620 span two locations and child nodes. Applications 620 can execute using local resources of each child node, which are selected among computing resources, storage resources, communication resources, and object node resources. Once applications 620 are deployed, pool resource manager 611 can reflect a current usage of the physical resources of the child nodes by removing these physical resources from the free pool of resources.

In a second example, data might be pushed to the edge for caching of the data by one or more child nodes. Data 621 might be initially requested by users or devices (e.g. object nodes) coupled to a first child node, such as child node 120. This data can include user data, files, user content, web content, images, video, configuration data, application data, or other various data types. Parent node 110 can retrieve data 621 from one or more data sources, such as data service 161. Once received into parent node 110, parent node 110 can deploy data 621 to one or more child nodes over the associated LAN and satellite communication links. Child node 120 can receive data 621 and store data 621 within one or more storage devices local to child node 120. One or more users, object nodes, or applications associated with child node can then consume data 621. Once cached or stored in child node 120, other child nodes might request one or more portions of data 621. These requests can be received by parent node 110. Parent node 110 can determine that data 621 is already cached by child node 120 and indicate to the other child node, such as child node 130, that data 621 can be provided by child node 120. Thus, child node 130 can request data 621 from child node 120 instead of from data service 161. Data 621 can be transferred between the child nodes using parent node 110 as an intermediary, such as over a LAN or satellite communication links which couple the child nodes and parent node 110.

Figure 7:
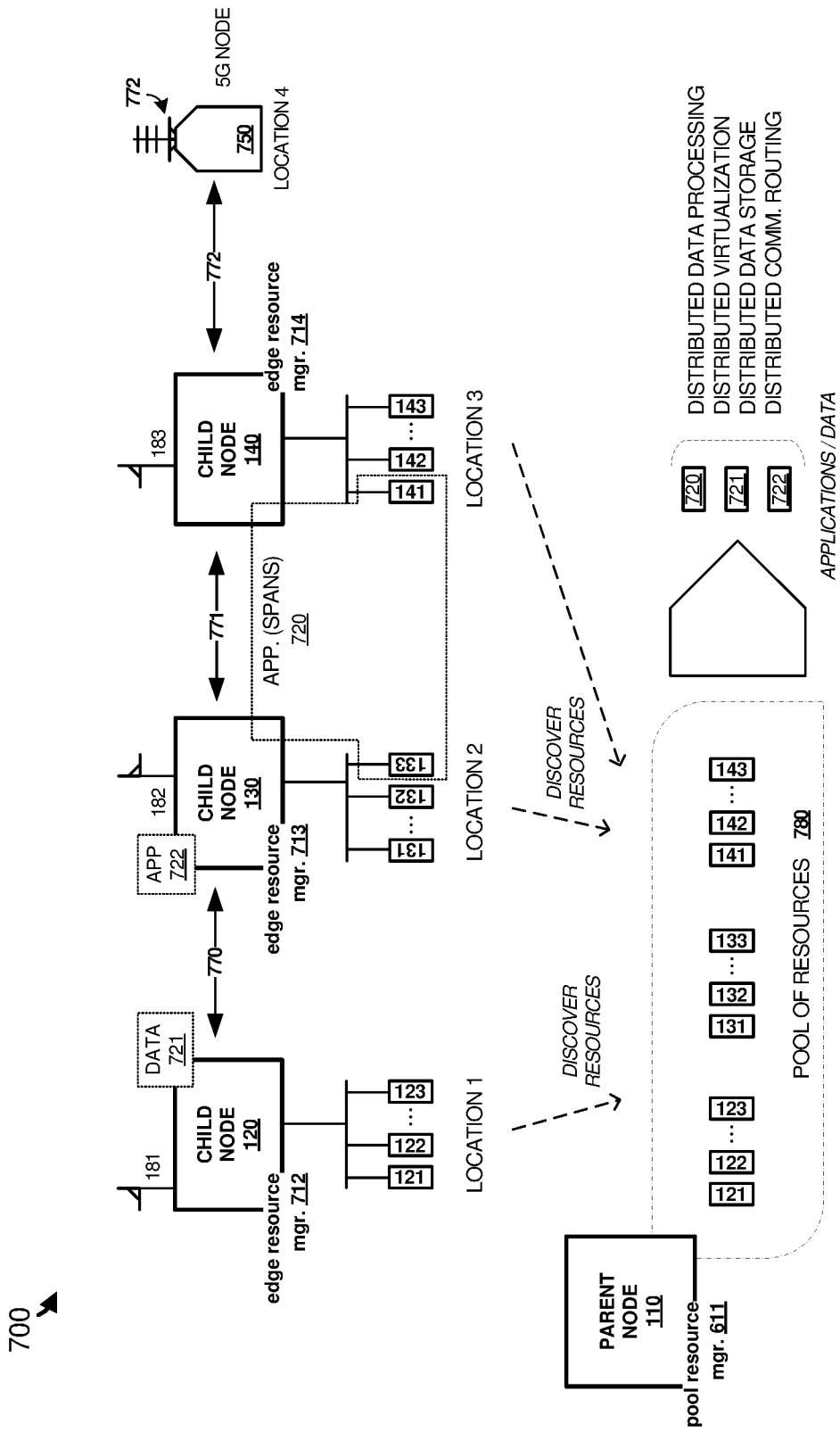
FIG. 7 illustrates a communication environment according to an implementation.

In some examples, child node 130 might have one or more other communication interfaces, such as terrestrial communication interfaces or local communication interfaces (wired or wireless) which can facilitate a more direct transfer of data 621 from child node 120 to child node 130. FIG. 7 illustrates terrestrial communication links 770-771 which are suitable for direct transfers. Data 621 might be stored at child node 120 until no longer needed by any child node, which might include a predetermined amount of time after a last-received request for data 621, or data 621 may be removed from child node 120 if other data has been requested at a later time which supersedes data 621, among other configurations. Data 621 might also be preemptively cached in one or more child nodes based on applications which have been deployed to the child nodes, or based on past activity patterns for particular child nodes, among other preemptive triggers for data caching at the 'edge' provided by child nodes. Furthermore, the applications deployed to a first child node might perform data caching activities initiated responsive to user activity of a first requestor object node coupled via a local communication interface to the first child node. The first child node can be configured to serve cached data to at least a second requestor object node. The second requestor object node could be located at the first child node or at a second child node.

In a third example, one or more applications are deployed to child nodes which perform telemetry, monitoring, sensing, or other activities which generates data at object nodes or the child node. The associated child node can temporarily cache or store this locally-generated data prior to transfer to one or more recipient systems. Alternatively, parent node 110 can perform caching duties for outgoing data and collect this data from one or more child nodes prior to transfer to further entities. The data can be stored until favorable conditions warrant transfer. These might include considering the status or properties of one or more satellite communication links that couple the child nodes, parent node, or other packet networks. For example, a current bandwidth of one or more satellite communication links might not support transfer of data generated by a child node, and that child node can cache such data until the bandwidth exceeds a target threshold. In another example, parent node 110 waits to transfer data until a predetermined amount has been collected in parent node 110, providing for a large burst transfer of data instead of many smaller transfers. Other configurations can be employed for temporary collection and caching of outgoing data generated at the child nodes.

Many of the examples discussed herein employ software applications, such as applications 127 in FIG. 1, user applications 520 in FIG. 5, applications 620 in FIG. 6, and applications 720 in FIG. 7, among others. In these examples, the software applications may be deployed as a collection of files, configuration data, and other metadata for native execution by a processing system using an operating system deployed to a child node. However, the software applications may instead be deployed and executed as virtualized software assemblies, referred to herein as virtual nodes. These virtual nodes may comprise full operating system virtual machines in some examples, and may further include virtual containers. These containers may include Docker containers, Linux containers, jails, or another similar type of virtual containment node, which can provide an efficient management of resources in a target system which executes the virtual node. The resources used by the containers may include kernel resources from the target system, and may include repositories and other resources that are approved to be shared with other containers or processes executing on the target system. Although resources may be shared between the containers on a target system, the containers might be provisioned to have private access to the operating system with a separate identifier space, file system structure, and communication interface.

A more detailed discussion on management and operation of physical resources at child nodes is now presented. FIG. 7 includes schematic view 700 of a pool of resources formed using resources found at three exemplary child nodes 120, 130, and 140. Pool resource manager 611 of parent node 110 can establish and manage this pool of resources. Each child node has a collection of object nodes coupled thereto over a corresponding local communication interface, namely object nodes 121-123, 131-133, and 141-143, which have been discussed above. Each child node typically includes various physical resources, such as processing resources, data storage resources, and communication resources. Each object node coupled to a child node will have a corresponding set of features defined in part by included circuitry, hardware, software, and other elements which provide a particular functionality of the corresponding object node.

Moreover, view 700 includes a terrestrial communication links 770-771 which facilitate more direct communication of data or applications between child nodes. Terrestrial communication links 770-771 can comprise any link discussed herein for links 124, 134, 144, and 170-172 of Figure, among other link types. View 700 also includes 5G communication node 750 which provides for an alternate terrestrial communication link 772 for child node 140 in addition to satellite communication interface 183. Although FIG. 7 employs a 5G cellular communications link defined by the 3GPP consortium, other cellular or terrestrial like types discussed herein can be employed, including earlier-defined and later-defined cellular link, protocol, and network configurations such as 3G and 4G, or 6G and beyond. 5G node 750 may be located at a different geographic location than that of child node 140, but still remain in communication proximity. 5G node 750 can be further coupled to one or more other 5G nodes or to backhaul links coupled to a cellular communication network or assorted packet communication networks.

Turning now to example operations for the elements of FIG. 7, flow diagrams are provided in FIGS. 8A and 8B. The operations of FIGS. 8A and 8B are discussed in the context of both FIG. 6 and FIG. 7, although similar functionality can be provided by any of the corresponding elements in the other Figures. Operations 800 of FIG. 8A focus on operations of a parent node, while operations 850 FIG. 8B focus on operations of a child node.

Turning first to FIG. 8A, pool resource manager 611 of parent node 110 establishes (810) a pool of child node resources, noted in FIG. 7 as pool of resources 780. Pool resource manager 611 can be configured to determine physical resources local to each of the plurality of child nodes, and establish pool of resources 780 from among the physical resources. Pool resource manager 611 can perform a discovery process by polling each child node to discover what physical resources are present at each child node, from among resources of each child node and that of locally-coupled object nodes. This polling can include querying the plurality of child nodes over corresponding satellite communication links to assemble the pool of resources from among the physical resources at each of the plurality of child nodes. Pool resource manager 611 can maintain one or more data structures with indications of the physical resources corresponding to each child node and current status of availability of the physical resources. Pool of resources 780 can comprise a pool of free or unused resources, and pool resource manager 611 can track resources which have been allocated or assigned from the free pool for use by activities of a child node.

Pool resource manager 611 determines (811) one or more applications for deployment to child nodes at the 'edge' of a communication system formed among at least a parent node and child nodes. One or more users or operators may wish to deploy applications to one or more child nodes for use of the local physical resources of the child node or to employ one or more object nodes for various tasks. In addition, the child nodes themselves or devices coupled thereto may initiate activities which prompts execution of an application by a child node or retrieval of data by the child node. The applications can be identified responsive to requests for execution of an application, which could be received from external users, child nodes, or object nodes.

Responsive to the requests, either a user/operator or pool resource manager 611 selects (812) child nodes at the edge for deployment of the applications, and allocates corresponding resources from pool of resources 780 for execution of the applications at one or more selected child nodes. In operation 811, the applications might perform monitoring activities employing object node resources, such as employing sensor devices, telemetry devices, or IoT devices included at the one or more selected child nodes. The applications might also include communication activities employing communication link resources included at the one or more selected child nodes to relay data collected by the object node resources. The applications might comprise one or more virtual nodes which are deployed from a storage system managed by parent node 110 or data service 161-162. These virtual nodes can be received by the selected child nodes and stored locally for execution by a processing system a virtualized execution system of the child nodes. In this manner, many applications can be deployed to each child node and the virtual nodes can each have segregated access to the relevant physical resources of the child node. Sharing of resources among child nodes might occur in certain cases, such as when a hypervisor system of the child node can manage sharing of memory, processor, storage, and communication resources among many virtual nodes. Sharing of object node resources among virtual nodes can also be managed in a similar fashion.

Sometimes resources might be available at child nodes, but these resources might not configured properly in a current state to support activities of the applications. Pool resource manager 611 can direct selected child nodes to alter the state of the resources to support activities of the desired applications. In one example, pool resource manager 611 can be configured to identify properties of at least a first satellite communication link associated with a first child node to determine if the first satellite communication link supports activities of the application with regard to the first child node. Responsive to the first satellite communication link determined to not support the activities, pool resource manager 611 can be configured to instruct the first child node to alter the first satellite communication link to support the activities of the application. The alteration might include altering properties of the satellite communication link or adding another satellite communication link, such as discussed above with regard to FIG. 2. In this manner, child nodes can be instructed to provide sufficient network connectivity over the corresponding satellite communication links to object nodes (e.g. one or more user devices or one or more sensor devices) coupled over local communication interfaces of the child nodes.

In other instances (813), resources of a single child node might not be sufficient to support the activities of the applications. In these instances, pool resource manager 611 can be configured to span the applications over more than one child node. Pool resource manager 611 might select physical resources across more than one child node for execution of the application. Pool resource manager 611 can then transfer at least a portion of an application to each of the selected child nodes, such as by transferring a copy of the application to two or more child nodes or deploying a virtual node to more than one child node to consume resources at each child node. If only one child node is sufficient for execution of the application, then pool resource manager 611 can deploy (814) the application to a selected child node from parent node 110. Responsive to deployment of the applications, the associated child nodes initiate execution of the applications using the allocated resources at the one or more selected child nodes.

Pool resource manager 611 also removes the allocated resources from pool of resources 780 until at least completion of execution of the application. For example, pool resource manager 611 can monitor (816) if the deployed applications or deployed data are still needed at the edge or at associated child nodes. If the resources are determined to no longer be needed for an application, then pool resource manager 611 returns (817) resources to pool of resources 780.

In further examples, during execution of the applications by at least a first child node, pool resource manager 611 can be configured to monitor utilization of resources of the first child node associated with execution of the application. Responsive to the utilization exceeding a threshold level, pool resource manager 611 can be configured to shift (817) at least a portion of the application for execution by a second child node to reduce the utilization of resources of the first child node. This shifting of workload might occur responsive to utilizations mentioned above, but might instead occur responsive to disruption in communications or connectivity of the child nodes that have the applications deployed thereto. State information related to current execution of the applications can be relayed by the child nodes to the parent node. Pool resource manager 611 might maintain data structures and storage elements with the state information of currently executing applications or currently deployed applications. Responsive to disruptions in operation of the child nodes, the associated resources, or communication links, pool resource manager 611 can transfer or shift one or more deployed applications, data, or workloads to another child node. The parent node hosting pool resource manager 611 might be an intermediary for the transfer or shift or pool resource manager 611 may instead instruct one or more child nodes to transfer the workload/application/data directly to another child node over an associated communication interface. Once transferred, applications or workloads can utilize resources of the new child node and begin execution according to state information. The state information might be transferred along with the workload, application, or data. In addition, any data transferred can be stored local to the new child node and made available for access to other nodes or users from that child node.

FIG. 7 includes a specific example of application or data deployment that spans child nodes. Application 720 and data 721-722 are indicated in FIG. 7. Application 720 can comprise a distributed application that spans resources of more than one child node, such as distributed data processing applications, distributed virtualization activities, distributed data storage activities, or distributed data communications routing activities for routing communications of object nodes. Application 720 and data 721-722 might be deployed to one or more selected child nodes for execution and usage of local resources (such as storage resources) of the selected child nodes. For example, data 721 might be deployed by parent node 110 to child node 120 over one or more satellite communication links that form SEN 102 or SEN 402. Data 722 might be generated at child node 130 and shared or served by child node 130 over one or more satellite communication links that form SEN 102 or SEN 402. Data 721-722 might be deployed to a first child node and then relayed over links 770-771 to another child node, or to other nodes, including object nodes and users.

Application 720 is shown as deployed to more than one child node, specifically, child nodes 130 and 140. Application 720 consumes resources included at both child node 130 and child node 140, such as computing, storage, communication, or object resources. The object resources might comprises sensor elements, telemetry elements, or IoT elements which are located at both child node 130 and child node 140. For example, application 720 might employ these spanned resources to leverage sensor resources across more than one child node. Parent node 110 can deploy portions of application 720 to each of child node 130 and child node 140. Child node 130 and child node 140 might exchange communications related to operations of application 720 over a corresponding LAN.

In addition to the factors for application deployment and data storage discussed herein, quality of service (QoS) can be taken into account. For example, deployment of applications to child nodes might consider QoS of the communication links used to deploy the applications, QoS of communication links that might service data generated or consumed by the applications, or QoS of resources local to the child nodes, such as QoS of object nodes. Parent node 110 might monitor QoS metrics for various child nodes and communication links associated with the child nodes before deployment of the applications or data. When selecting which child nodes should receive deployed applications or data, parent node 110 might consider QoS among other factors to select specific child nodes that can support the application execution requirements, communication link requirements, storage requirements, or other task-specific needs. Also, when shifting workloads, parent node 110 or any associated child node might trigger shifting of workloads based on QoS metrics indicating that certain applications or data services are not having specified QoS levels being met. Thus, in operation 817, shifting of workloads might take into account not only the performance or status of a child node, but QoS specified for the workload.

Turning now to FIG. 8B and operations 850, functionality of resource management at the edge is discussed. The 'edge' refers primarily to functionality at the child nodes or object nodes. In FIG. 7, each of child nodes 120, 130, and 140 has a local resource manager, indicated by edge resource managers 712-714. These edge resource managers can be examples of edge resource manager 1027 of FIG. 10, although variations are possible. In FIG. 8B, process connector 820 links operations of FIG. 8A to FIG. 8B. Typically, the operations of FIG. 8B are relevant once applications or data have been deployed to child nodes by a parent node. However, the operations of FIG. 8B might occur without the initial deployment of a parent node, such as when a child node has pre-existing applications/data or object-node initiated applications or data.

Child nodes 120, 130, and 140 can provide associated local resources for execution of deployed applications at the edge, as well as storage of data at the edge. These resources can include any of the various child node or object node resources discussed herein. Once deployed, the applications or data might be in an active, inactive, or throttled state, and when virtualized execution platforms like hypervisors are employed, then applications can be initiated using virtual nodes. Moreover, child nodes 120, 130, and 140 have a limited amount of resources which might be shared among users, object nodes, or applications. FIG. 8B relates to how to manager these limited resources and adapt to dynamic conditions at the edge.

In operation 860, a child node receives deployment instructions for applications or data. These instructions might include indications and policies on what resources are required for execution of the application, such as processing, storage, or communication resources along with applicable bandwidths, latencies, or other parameters. These instructions can be employed by policy engines of the child nodes to establish which resources are allocated (861) to which applications or data. Edge resource managers 712-714 can then monitor (862) the resources of the corresponding child nodes in regard to the deployed applications and data. Edge resource managers 712-714 can establish various triggers which alter a state of execution or state of allocated resources, such as by triggering a start, stop, or throttling of applications or data. In FIG. 8B, these triggers can include link resources triggers (863), time triggers (865), and workload triggers (867). Since edge resource managers 712-714 have visibility to the resources of the particular child node, decisions on allocation of those resources can be made locally to the child node. Data can be parsed to determine which data has a higher priority or critical property so as to be transferred or stored ahead of other data. Various data can be categorized among high priority, medium priority, and low priority or best effort data. Applications may have similar categorization for execution and resource utilization.

A link resource trigger (863) can include triggers based on properties of communication links affecting a child node, such as communication link bandwidth, communication link latency, communication link type availability, or other communication link properties. For example, a satellite link for a child node might experience reduced bandwidth due to movement of associated satellite devices, atmospheric fading, interference, or other conditions and influences. A threshold for bandwidth can be established for one or more applications deployed to the child node, and when the bandwidth of a particular link falls below the threshold bandwidth, then an edge resource manager can reallocate resources, initiate further communication links, or throttle/stop an application until the bandwidth conditions improve. Likewise, if a communication link has properties which do not presently support execution of an application, then the edge resource manager can hold that application idle until bandwidth conditions improve. Thus, edge resource managers 712-714 of child nodes can alter (864) resources or deployment associated with applications or data to compensate for changes in link properties. In further examples, a child node might collect and cache data generated by one or more object nodes, such as telemetry data from the object nodes. This telemetry data can be held from transfer until one or more bandwidth triggers are met, and once met the data can be burst transferred over a corresponding communication link to the parent node, another child nodes, or for transfer to further endpoints.

A time trigger (865) can include triggers based on time of day or day of the week, among other temporal triggers. These triggers might include periodic timers, peak activity detection, or other triggers. Edge resource managers 712-714 can monitor the time or day, among other parameters, and adjust resources according to these parameters. Applications and data might reside at a child node in an idle, throttled, or inactive state until a particular time, with resources of the child node assigned to other workloads or to other tasks. Edge resource managers 712-714 can activate the applications or begin to service/serve the data responsive to time triggers being satisfied. Moreover, edge resource managers 712-714 can activate or deploy (866) resources of the child nodes once the time triggers have been satisfied. In further examples, a child node might collect and cache data generated by one or more object nodes, such as telemetry data from the object nodes. This telemetry data can be held from transfer until one or more time triggers are met, and once met the data can be burst transferred over a corresponding communication link to the parent node, another child nodes, or for transfer to further endpoints.

A workload trigger (867) can include triggers based on local resource utilization of the child nodes, and can be related to link resource utilization. The resources might include local network utilization, processor utilization, memory utilization, storage utilization, or other local resource utilization. Edge resource managers 712-714 can deploy applications or data in the child nodes based on changes in workloads. For example, when a first application is executing and using resources of a child node, other applications might be throttled or wait until that first application has ceased execution or entered an idle mode before the other applications ramp up on such resources. Moreover, resources might be overutilized at a child node and edge resource managers 712-714 might shift (868) the workloads among child nodes to balance the loading of local resources of affected child nodes. This shifting of workloads can include capturing a state of execution or state of processing for affected applications and transferring the state to other child nodes for execution of the corresponding applications. The applications themselves also might be transferred to the other child nodes when the applications have not yet been deployed to those child nodes.

Advantageously, edge resource managers 712-714 can handle allocation and usage of local resources of child nodes without involvement of the parent node once the applications and data have been deployed to the edge. Various intelligent decisions can be made at the edge as to what applications are executed, what data is stored and transferred, and when all of these activities can occur based on local conditions of the child nodes. As these conditions change over time, edge resource managers 712-714 can adjust the execution of workloads, shift execution of workloads, assign/allocate resources, and transfer data, among other activities.

FIG. 9 illustrates parent node 910 that is representative of any system or collection of systems from which the various operations discussed herein for parent nodes can be directed, including child node discovery, child node control, satellite communication link control, satellite link-based LAN establishment, pool resource management, and application/data deployment, among other operations. Any of the operational architectures, platforms, scenarios, and processes disclosed herein may be implemented using elements of parent node 910. In one implementation, parent node 910 is representative of at least a portion of parent node 110 of FIG. 1. In some examples, child node 910 comprises an enhanced very small aperture terminal (VSAT).

Parent node 910 may be implemented as a single apparatus, system, or device or may be implemented in a distributed manner as multiple apparatuses, systems, or devices. Parent node 910 includes, but is not limited to, processing system 911, communication interface system 912, storage system 913, random access memory (RAM) 914, and software 920. Processing system 911 is operatively coupled with storage system 913 and communication interface system 912. Communication interface system 912 includes one or more specialized communication interfaces, such as satellite communication interface 950 which can communicate over one or more satellite communication links 955, and terrestrial communication interface 970 which can communicate over one or more terrestrial communication links 975.

Processing system 911 loads and executes software 920 from storage system 913. When executed by processing system 911, software 920 directs processing system 911 to operate as described herein for at least the various processes, operational scenarios, and sequences discussed in the foregoing implementations. Parent node 910 may optionally include additional devices, features, or functionality not discussed for purposes of brevity. Processing system 911 may comprise a microprocessor and processing circuitry that retrieves and executes software 920 from storage system 913. Processing system 911 may be implemented within a single processing device, but may also be distributed across multiple processing devices, sub-systems, or specialized circuitry, that cooperate in executing program instructions and in performing the operations discussed herein. Examples of processing system 911 include general purpose central processing units, application specific processors, and logic devices, as well as any other type of processing device, combinations, or variations thereof.

Storage system 913 may comprise any computer readable storage media readable by processing system 911 and capable of storing software 920. Storage system 913 may include volatile and nonvolatile, removable and non-removable media implemented in any method or technology for storage of information, such as computer readable instructions, data structures, program modules, or other data. Examples of storage media include random access memory (RAM) 914, read only memory, magnetic disks, optical storage media, flash memory, HDDs, SSDs, virtual memory and non-virtual memory, magnetic storage media, or any other suitable storage media. Storage system 913 may be implemented as a single storage device, but may also be implemented across multiple storage devices or sub-systems co-located or distributed relative to each other. Storage system 913 may comprise additional elements, such as a controller, capable of communicating with processing system 911 or possibly other systems.

Software 920 may be implemented in program instructions. When executed by processing system 911, software 920 directs processing system 911 to operate as described with respect to the various operational scenarios, sequences, and processes illustrated herein. For example, software 920 may include program instructions for providing enhanced child node discovery, child node control, satellite communication link control, satellite link-based LAN establishment, pool resource management, and application/data deployment, among other operations. In particular, the program instructions of software 920 may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 920 may include additional processes, programs, or components, such as operating system software, hypervisor components, applications, or other software. Software 920 may also comprise program code, scripts, macros, and other similar components. Software 920 may also comprise software or some other form of machine-readable processing instructions executable by processing system 911.

Software 920 may, when loaded into processing system 911 and executed, transform a suitable apparatus, system, or device (of which parent node 910 is representative) overall from a general-purpose computing system into a special-purpose computing system customized to facilitate at least child node discovery, child node control, satellite communication link control, satellite link-based LAN establishment, pool resource management, and application/data deployment operations. Encoding software 920 on storage system 913 may transform the physical structure of storage system 913. The specific transformation of the physical structure may depend on various factors in different implementations of this description. Examples of such factors may include, but are not limited to, the technology used to implement the storage media of storage system 913 and whether the computer-storage media are characterized as primary or secondary storage, as well as other factors. For example, if the computer readable storage media are implemented as semiconductor-based memory, software 920 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Software 920 can include one or more software elements, such as an operating system, device drivers, hypervisor or virtualization elements, and one or more applications. For example, an operating system and hypervisor 921 can provide a software platform on which storage software elements 922-926 are executed. Operating system/hypervisor 921 is capable of providing a platform for virtual nodes according to an implementation. Operating system/hypervisor 921 is representative of a virtualized execution system, which includes a virtualized user space for virtual nodes 922, an operating system or hypervisor, a storage space in storage system 913 to store the operating system and virtual user space, and processing resources of processing system 911.

Users, operators, or organizations may generate applications that are capable of being deployed as virtual nodes on one or more parent nodes or child nodes. These applications may be provided from a data services system, storage system, or may be provided from another communication node. Once the applications are provided, operating system/hypervisor 921, which is stored on storage system 913 and executed by processing system 911 may provide a platform for the execution of the applications. Here, each application provided to parent node 910 is executed as separate virtualized software assemblies, referred to as virtual nodes and shown as virtual nodes 922. Virtual nodes 922 may comprise full operating system virtual machines or containers capable of sharing resources from the underlying operating system in storage system 913.

Operating system/hypervisor 921 manages the execution of virtual nodes 922, and may manage a schedule that is used to allocate processing resources of processing system 911, communication resources of communication interface system 912, and storage resources of storage system 913 to each of virtual nodes 922. In particular, the schedule may be used to ensure that each application is scheduled to receive processing resources from processing system 911 during defined time periods, and receive access to communication interface system 912 during defined time periods. In some implementations, one or more of the applications may execute during the same time period on parent node 910. These applications may use different resources of parent node 910 (or locally coupled devices), may time share the use of resources of parent node 910, or may use the same data in their operation. To allocate the resources of parent node 910, operating system/hypervisor 921 may be responsible for providing each operating virtual node with access information for the required resources of parent node 910, and deallocating or removing the access to the required resources of parent node 910 based on the scheduling. For example, a resource may be accessed by a first of virtual nodes 922 during a first time period, where the first of virtual nodes 922 may access the resource based on access information provided by operating system/hypervisor 921. Once the time period expires, operating system/hypervisor 921 may prevent the first of virtual nodes 922 from accessing the resource. In some examples, this may occur by removing the access for the first of virtual nodes 922, and allocating access of the resource to a second of virtual nodes 922.

In addition to applications deployed as virtual nodes 922, other applications and functionality is provided by software 920. These other applications and functionality are indicated by edge deployer 923, pool resource manager 924, link manager 925, and child node tracker 926. Edge deployer 923, pool resource manager 924, link manager 925, and child node tracker 926 can be deployed and executed as native applications, or instead as separate virtual nodes, similar to that discussed above for virtual nodes 922.

Edge deployer 923 can transfer at least a portion of an application to one or more child node over satellite communication links, deploy one or more virtual nodes to child nodes over satellite communication links for execution by the child nodes, and deploy one or more virtual nodes to child nodes over a local area network for execution of at least an application that spans resources of more than one child node. Edge deployer 923 can deploy data for caching by one or more child node, and applications for caching by one or more child node.

Pool resource manager 924 can establish a pool of resources, select physical resources across more than one child node for execution of an application, allocate resources from a pool of resources for execution of an application at one or more selected child nodes and remove the allocated resources from the free pool of resources until at least completion of execution of the application. Pool resource manager 924 can select physical resources across more than one child node for execution of an application. Pool resource manager 924 can initiate execution of an application using the allocated resources at one or more selected child nodes. Pool resource manager 924 can identify properties of at least a first satellite communication link associated with a first child node to determine if the first satellite communication link supports activities of an application with regard to a child node, and responsive to the first satellite communication link determined to not support the activities, instruct the child node to alter the first satellite communication link. During execution of an application by at least a child node, pool resource manager 924 can monitor utilization of resources of a child node associated with execution of the application. Responsive to the utilization exceeding a threshold level, pool resource manager 924 can shift at least a portion of an application for execution by a subsequent child node to reduce the utilization of resources of an initial child node.

Link manager 925 can establish a local area network over at least a satellite communication pathway with one or more child nodes. Link manager 925 can establish the local area network by at least establishing a network transport layer for child nodes over one or more link layers provided by the satellite communication pathway. Link manager 925 can maintain the local area network with a child node after the child node changes to communicating over a second satellite communication pathway provided by a second satellite communication service provider. Link manager 925 can route at least a portion of data related to the operation of the one or more local telemetry devices to at least one additional child node coupled to the local area network over an additional satellite communication pathway.

Child node tracker 926 can perform various discovery processes to discover child nodes for inclusion into an arrangement with a parent node. Child node tracker 926 can receive indications of child nodes that are desired to be included in an arrangement with a parent node. Child node tracker 926 can determine physical resources local to each of a plurality of child nodes, query the plurality of child nodes over corresponding satellite communication links to assemble a pool of resources from among the physical resources at each of the plurality of child nodes. Child node tracker 926 can monitor utilization of resources of a child node associated with execution of application.

Communication interface system 912 may include communication connections and elements that allow for communication over links 955 and 975 with other external systems (not shown in FIG. 9) over one or more communication links or networks (not shown). Links 955 can use optical, air, or space as the transport media. Links 975 can use metal, glass, optical, air, space, or some other material as the transport media. Links 955 and 975 can be direct links or may include intermediate networks, systems, or devices, and can include a logical network link transported over multiple physical links. Other example links not shown in FIG. 9 which might be used separately or in combination with the above include discrete control links, system management buses, serial control interfaces, register programming interfaces, application programming interfaces (APIs), network interface cards, and other communication software and circuitry. Communication interface system 912 may communicate over communication media to exchange communications with other computing systems or networks of system. Communication interface system 912 may include user interface elements, such as programming registers, control/status registers, APIs, web interfaces, display interfaces, or other user-facing control and status elements.

Satellite communication interface 950 is configured to communicate over one or more satellite communication links 955 to support at least communications with satellite devices to reach one or more child nodes. Satellite communication interface 950 comprises one or more transceivers, antennas, antenna arrays, dish antennas, antenna feed elements, signal splitters, RF or optical amplifiers, low-noise block downconverters (LNBs), low-noise downconverters (LNDs), block upconverters (BUCs), satellite trackers, phased antenna arrays, antenna motor mounts, and other RF or optical communication circuitry and equipment. Satellite communication interface 950 can employ various communication interface types and protocols discussed herein. Satellite communication interface 950 may utilize a frequency range corresponding to the IEEE bands of L band, S band, C band, X band, Ku band, Ka band, V band, W band, among others. Other example communication frequency ranges include Ultra high frequency (UHF), super high frequency (SHF), extremely high frequency (EHF), or other service categories such as broadcast satellite service (BSS), fixed-satellite service (FSS), mobile-satellite service (MSS) or similar services for broadcast communications.

In addition to the preceding discussion, satellite communication interface 950 can include any of the elements discussed in FIG. 10 for satellite communication interface 1050. Additionally, more than one instance of satellite communication interface 950 can be included in parent node 910, with each instance capable of communicating over a separate satellite communication link. The separate satellite communication links can be with different satellite devices, different orbital satellite groups, and different satellite communication service providers. Separate aiming of antennas, dish elements, phased arrays, beamforming, and the like can support the multiple different satellite communication links.

Terrestrial communication interface 970 is configured to communicate over one or more communication links 975 to support at least communications with one or more external systems, cloud systems, distributed data systems, or packet networks, or with one or more airborne communication nodes. Terrestrial communication interface 970 comprises one or more transceivers, antennas, antenna arrays, RF or optical amplifiers, airborne node trackers, phased antenna arrays, optical aiming apparatuses, and other RF or optical communication circuitry and equipment. Terrestrial communication interface 970 can employ various communication interface types and protocols, such as Internet Protocol (IP) versions 4 or 6, Ethernet, universal serial bus (USB), Wireless USB, Peripheral Component Interconnect Express (PCIe), Thunderbolt, Bluetooth, IEEE 802.11 (WiFi), WiMAX (Worldwide Interoperability for Microwave Access), microwave RF communications, VHF communications, UHF communications, low-power wide-area network (LPWAN), LoRa (Long Range), low-rate wireless personal area networks (LR-WPANs), IEEE 802.15.4 (Zigbee, among others), Near-field communication (NFC), Infrared Data Association (IrDA), hybrid fiber-coax (HFC), synchronous optical networking (SONET), asynchronous transfer mode (ATM), Time Division Multiplex (TDM), Long-Term Evolution (LTE), 3rd Generation Partnership Project (3GPP)-defined protocols, 5G or 5G NR (New Radio) communications, or other communication signaling or communication formats, including combinations, improvements, or variations thereof.

FIG. 10 illustrates child node 1010 that is representative of any system or collection of systems from which the various operations discussed herein for child nodes can be directed, including object node discovery and management, satellite communication link control, deployed application execution, pool resource reporting, and edge data/application caching, among other operations. Any of the operational architectures, platforms, scenarios, and processes disclosed herein may be implemented using elements of child node 1010. In one implementation, child node 1010 is representative of at least a portion of child nodes 120, 130, 140 of FIG. 1, or child node 420 of FIG. 4. In some examples, child node 1010 comprises an enhanced very small aperture terminal (VSAT).

Child node 1010 may be implemented as a single apparatus, system, or device or may be implemented in a distributed manner as multiple apparatuses, systems, or devices, which may include virtualized portions. Child node 1010 includes, but is not limited to, processing system 1011, communication interface system 1012, storage system 1013, random access memory (RAM) 1014, and software 1020. Processing system 1011 is operatively coupled with storage system 1013 and communication interface system 1012. Communication interface system 1012 includes one or more specialized communication interfaces, such as satellite communication interfaces 1050 which can communicate over one or more satellite communication links 1055, terrestrial communication interface 1070 which can communicate over one or more terrestrial communication links 1075, and object communication interface 1080 can communicate over one or more object communication links 1085.

Processing system 1011 loads and executes software 1020 from storage system 1013. When executed by processing system 1011, software 1020 directs processing system 1011 to operate as described herein for at least the various processes, operational scenarios, and sequences discussed in the foregoing implementations. Child node 1010 may optionally include additional devices, features, or functionality not discussed for purposes of brevity. Processing system 1011 may comprise a microprocessor and processing circuitry that retrieves and executes software 1020 from storage system 1013. Processing system 1011 may be implemented within a single processing device, but may also be distributed across multiple processing devices, sub-systems, or specialized circuitry, that cooperate in executing program instructions and in performing the operations discussed herein. Examples of processing system 1011 include general purpose central processing units, application specific processors, and logic devices, as well as any other type of processing device, combinations, or variations thereof.

Storage system 1013 may comprise any computer readable storage media readable by processing system 1011 and capable of storing software 1020. Storage system 1013 may include volatile and nonvolatile, removable and non-removable media implemented in any method or technology for storage of information, such as computer readable instructions, data structures, program modules, or other data. Examples of storage media include random access memory (RAM) 1014, read only memory, magnetic disks, optical storage media, flash memory, HDDs, SSDs, virtual memory and non-virtual memory, magnetic storage media, or any other suitable storage media. Storage system 1013 may be implemented as a single storage device, but may also be implemented across multiple storage devices or sub-systems co-located or distributed relative to each other. Storage system 1013 may comprise additional elements, such as a controller, capable of communicating with processing system 1011 or possibly other systems.

Software 1020 may be implemented in program instructions. When executed by processing system 1011, software 1020 directs processing system 1011 to operate as described with respect to the various operational scenarios, sequences, and processes illustrated herein. For example, software 1020 may include program instructions for providing enhanced object node discovery and management, satellite communication link control, deployed application execution, pool resource reporting, and edge data/application caching, among other operations. In particular, the program instructions of software 1020 may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1020 may include additional processes, programs, or components, such as operating system software, hypervisor components, applications, or other software. Software 1020 may also comprise program code, scripts, macros, and other similar components. Software 1020 may also comprise software or some other form of machine-readable processing instructions executable by processing system 1011.

Software 1020 may, when loaded into processing system 1011 and executed, transform a suitable apparatus, system, or device (of which child node 1010 is representative) overall from a general-purpose computing system into a special-purpose computing system customized to facilitate at least object node discovery and management, satellite communication link control, deployed application execution, pool resource reporting, and edge data/application caching operations. Encoding software 1020 on storage system 1013 may transform the physical structure of storage system 1013. The specific transformation of the physical structure may depend on various factors in different implementations of this description. Examples of such factors may include, but are not limited to, the technology used to implement the storage media of storage system 1013 and whether the computer-storage media are characterized as primary or secondary storage, as well as other factors. For example, if the computer readable storage media are implemented as semiconductor-based memory, software 1020 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Software 1020 can include one or more software elements, such as an operating system, device drivers, hypervisor or virtualization elements, and one or more applications. For example, an operating system and hypervisor 1021 can provide a software platform on which storage software elements 1022-1027 are executed. Operating system/hypervisor 1021 is capable of providing a platform for virtual nodes according to an implementation. Operating system/hypervisor 1021 is representative of a virtualized execution system, which includes a virtualized user space for virtual nodes 1022, an operating system or hypervisor, a storage space in storage system 1013 to store the operating system and virtual user space, and processing resources of processing system 1011. Software 1020 might also include other elements, such as firewalls, resource orchestration interfaces and algorithms, encryption modules, authentication modules, and other features.

Users, operators, or organizations may generate applications that are capable of being deployed as virtual nodes on one or more parent nodes or child nodes. These applications may be provided from a data services system, storage system, or may be provided from another communication node. Once the applications are provided, operating system/hypervisor 1021, which is stored on storage system 1013 and executed by processing system 1011 may provide a platform for the execution of the applications. Here, each application provided to child node 1010 is executed as separate virtualized software assemblies, referred to as virtual nodes and shown as virtual nodes 1022. Virtual nodes 1022 may comprise full operating system virtual machines or containers capable of sharing resources from the underlying operating system in storage system 1013.

Operating system/hypervisor 1021 manages the execution of virtual nodes 1022, and may manage a schedule that is used to allocate resources to each of virtual nodes 1022, such has processing resources of processing system 1011, communication resources of communication interface system 1012, storage resources of storage system 1013, and object node resources of connected object nodes. In particular, the schedule may be used to ensure that each application is scheduled to receive resources during defined time periods. In some implementations, one or more of the applications may execute or share resources during the same time period on child node 1010. These applications may use different resources of child node 1010 (or locally coupled devices), may time share the use of resources of child node 1010, or may use the same data in their operation. To allocate the resources of child node 1010, operating system/hypervisor 1021 may be responsible for providing each operating virtual node with access information for the required resources of child node 1010 or object node resources of connected object nodes, and deallocating or removing the access to the required resources based on the scheduling. For example, a resource may be accessed by a first of virtual nodes 1022 during a first time period, where the first of virtual nodes 1022 may access the resource based on access information provided by operating system/hypervisor 1021. Once the time period expires, operating system/hypervisor 1021 may prevent the first of virtual nodes 1022 from accessing the resource. In some examples, this may occur by removing the access for the first of virtual nodes 1022, and allocating access of the resource to a second of virtual nodes 1022.

In addition to applications deployed as virtual nodes 1022, other applications and functionality is provided by software 1020. These other applications and functionality are indicated by application cache 1023, data cache 1024, policy engine 1025, link manager 1026, and edge resource manager 1027. Application cache 1023, data cache 1024, policy engine 1025, link manager 1026, and edge resource manager 1027 can be deployed and executed as native applications, or instead as separate virtual nodes, similar to that discussed above for virtual nodes 1022.

Application cache 1023 provides for caching of applications in a local storage system of child node 1010, such as in storage system 1013. Application cache 1023 provides for deployment of the cached applications to object nodes, child node 1010, or to other child nodes over terrestrial communication interface 1070 or object communication interface 1080. Data cache 1024 provides similar caching features as application cache 1023, but for data and content requested by object nodes, child node 1010, or to other child nodes over terrestrial communication interface 1070 or object communication interface 1080. Application cache 1023 or data cache 1024 can perform caching responsive to requests for the applications or data, or can instead preemptively cache data based on deployed applications or historical patterns. Data cache 1024 might cache data generated by one or more applications executed by a child node, and hold/store that data until transfer to another child node, parent node, or other endpoint. Quality of service of the resources of the child node or communication links can be considered for initiating transfer of data stored in data cache 1024. For example, particular policies might be control times for transfer of data from data cache 1024, such as times of day according to policies, when communication bandwidths exceed threshold levels, when local resources of a child node fall below certain utilization threshold levels, or when other parameters indicated by a user dictate changes such as temporal (time of day, day of week, etc.), financial (link costs), or other characteristics. These policies can operate for transfers of data from data cache 1024, or for transfer of data into data cache 1024 for use by the local child node or object nodes.

Policy engine 1025 can provide data related to operation of one or more local object nodes, such as sensors, telemetry devices, or IoT devices, over a local area network for receipt by a parent node. Policy engine 1025 can parse at least a first portion of data related to operation of one or more local object nodes and route the first portion of the data over a second local communication interface for alert of activities related to the operation of the one or more local object nodes. Policy engine 1025 can identify communication requirements related to execution of one or more applications by child node 1010. Policy engine 1025 can initiate changes to one or more satellite communication links based at least on application communication requirements and properties of the one or more satellite communication links. Policy engine 1025 can process one or more triggers to initiate changes to the one or more satellite communication links. Policy engine 1025 can initiate at least a second satellite communication link over a second satellite communication service provider different than a first satellite communication service provider to accommodate at least application communication requirements. Policy engine 1025 can direct link manager 1026 to discontinue a satellite communication link and communicate over a second satellite communication link, direct link manager 1026 to establish a combined communication bandwidth associated with a first satellite communication link and a at least one additional satellite communication link, and provide a combined communication bandwidth to at least an application associated with the application communication requirements. Responsive to changes in the properties of one or more satellite communication links indicating a communication link quality falling below a quality threshold, policy engine 1025 can select a different communication pathway than an initial satellite communication link to accommodate at least the communication requirements. The different communication pathway may comprise a communication link provided by an airborne node that has link availability with at least one among a satellite communication network and a terrestrial communication network. Responsive to changes in properties of one or more satellite communication links indicating a communication link quality falling below a quality threshold, policy engine 1025 can identify at least one among a different communication frequency, different communication coding scheme, different data or signal compression scheme, different beam direction, and different satellite communication service provider to accommodate at least the communication requirements.

Link manager 1026 can communicate over one or more satellite communication links provided by at least a satellite communication service provider. Link manager 1026 can monitor properties of the one or more satellite communication links. Link manager 1026 can establish a local area network over at least a satellite communication pathway, communicate over at least the satellite communication pathway to establish a connection to the local area network and route communications of a local communication interface to the local area network.

Edge resource manager 1027 can establish management of child node resources, select physical resources of a child node for execution of an application, allocate child node resources for execution of an application, monitor current conditions of child nodes, and trigger various shifting or adjustment of workloads, execution, or other activities. Edge resource manager 1027 can identify properties of at least a first satellite communication link associated with a child node to determine if the first satellite communication link supports activities of an application with regard to the child node, and responsive to the first satellite communication link determined to not support the activities, instruct the child node to alter the first satellite communication link or adjust execution of the application to suit the available properties of the first satellite communication link. During execution of an application, edge resource manager 1027 can monitor utilization of resources of a child node associated with execution of the application. Responsive to the utilization exceeding a threshold level, edge resource manager 1027 can shift at least a portion of an application for execution by a subsequent child node to reduce the utilization of resources of an initial child node. Edge resource manager 1027 can perform other activities as discussed in FIG. 8B for edge resource managers 712-714.

Communication interface system 1012 may include communication connections and elements that allow for communication over links 1055, 1075, and 1085 with other external systems (not shown in FIG. 10) over one or more communication links or networks (not shown). Links 1055 can use optical, air, or space as the transport media. Links 1075 and 1085 can use metal, glass, optical, air, space, or some other material as the transport media. Links 1055, 1075, and 1085 can be direct links or may include intermediate networks, systems, or devices, and can include a logical network link transported over multiple physical links. Other example links not shown in FIG. 10 which might be used separately or in combination with the above include discrete control links, system management buses, serial control interfaces, register programming interfaces, application programming interfaces (APIs), network interface cards, and other communication software and circuitry. Communication interface system 1012 may communicate over communication media to exchange communications with other computing systems or networks of system. Communication interface system 1012 may include user interface elements, such as programming registers, control/status registers, APIs, web interfaces, display interfaces, or other user-facing control and status elements.

Satellite communication interface 1050 is configured to communicate over one or more satellite communication links 1055 to support at least communications with satellite devices to reach parent nodes or other child nodes. Satellite communication interface 1050 comprises one or more transceivers, antennas, antenna arrays, dish antennas, antenna feed elements, signal splitters, RF or optical amplifiers, low-noise block downconverters (LNBs), low-noise downconverters (LNDs), block upconverters (BUCs), satellite trackers, phased antenna arrays, antenna motor mounts, and other RF or optical communication circuitry and equipment. Satellite communication interface 1050 can employ various communication interface types and protocols discussed herein. Satellite communication interface 1050 may utilize a frequency range corresponding to the IEEE bands of L band, S band, C band, X band, Ku band, Ka band, V band, W band, among others. Other example communication frequency ranges include ultra high frequency (UHF), super high frequency (SHF), extremely high frequency (EHF), or other service categories such as broadcast satellite service (BSS), fixed-satellite service (FSS), mobile-satellite service (MSS) or similar services for broadcast communications. In addition to the preceding discussion, satellite communication interface 1050 can include any of the elements discussed in FIG. 10 for satellite communication interface 1050.

A detailed view of one example implementation of satellite communication interface 1050 is shown in view 1001 in FIG. 10. View 1001 shows satellite communication interface 1050 as including software defined radio (SDR) 1051 and antenna interface (UF) 1060. More than one instance of satellite communication interface 1050 will typically be included in child node 1010, with each instance capable of communicating over a separate satellite communication link. The separate satellite communication links can be with different satellite devices, different orbital satellite groups, and different satellite communication service providers. Separate aiming of antennas, dish elements, phased arrays, beamforming, and the like can support the multiple different satellite communication links.

SDR 1051 includes forward error correction (FEC) element 1052, system timing element 1053, and multiplexer (MUX) 1054. FEC element 1052 can correct for various bit errors in communications received by child node 1010 or transmitted by child node 1010. Data is fed into FEC element 1052 during uplink operations to encode the data with error correction bits. Received bits are fed into FEC element 1052 during downlink operations to decode the data using error correction bits and correct for one or more bit errors. System timing element 1053 comprises timing circuitry, clock circuitry, modulation circuitry, and can perform various transmit/receive or uplink/downlink timing operations among the elements of SDR 1051 and antenna interface 1060, which might include determining and enforcing protocol-specific or frequency/channel-specific timing parameters and modulation parameters. System timing element 1053 can control up conversion/down conversion frequencies and operations of upconverter 1061 and downconverter 1063. Multiplexer 1054 comprises multiplexor circuitry and handles multiplexing among uplink/downlink data as well as control instructions for control of the elements of satellite communications interface 1050.

Antenna interface 1060 includes upconverter 1061, control circuit 1062, downconverter 1063, transmitter/uplink antenna interface 1064, orthomode transducer (OMT) 1065, receiver/downlink antenna interface 1066, antenna feed element 1067, antenna management element 1068, and dish/antenna 1069. Control circuit 1062 can control up conversion/down conversion frequencies and operations of upconverter 1061 and downconverter 1063, and can receive associated control parameters from system timing element 1053. Control circuit 1062 can control operations of transmitter/uplink antenna interface 1064 and receiver/downlink antenna interface 1066. Upconverter 1061 includes oscillator circuitry, phase-locked loop (PLL) circuitry, and frequency reference circuitry to convert a signal having a first functional frequency to a signal having a second, typically higher, RF frequency. Upconverter 1061 can comprise one or more block upconverters (BUCs). Downconverter 1063 includes oscillator circuitry, PLL circuitry, and frequency reference circuitry to convert a signal having a first RF frequency to a signal having a second, typically lower, functional frequency. Downconverter 1063 may comprise one or more low-noise block downconverters (LNBs) or low-noise downconverters (LNDs). OMT 1065 is configured to combine or to separate two orthogonally polarized RF signal pathways. A first signal pathway of OMT 1065 corresponds to an uplink pathway, and a second pathway of OMT 1065 corresponds to a downlink pathway.

Transmitter/uplink antenna interface 1064 comprises a portion of the uplink pathway, and receiver/downlink antenna interface 1066 comprises a portion of the downlink pathway. Transmitter/uplink antenna interface 1064 can include RF power amplifiers, transceiver circuitry, antenna interface circuitry, and other elements. Receiver/downlink antenna interface 1066 can include transceiver circuitry, receiver circuitry, antenna interface circuitry, and other elements. Antenna feed element 1067 comprises a feed antenna which sources RF energy to dish/antenna 1069.

Antenna feed element 1067 can receive RF energy from a transmitter as well. Antenna feed element 1067 may comprise a feed horn. Dish/antenna 1069 comprises one or more parabolic dish elements and couples mechanically to antenna feed element 1067. Although a dish style of antenna is discussed in FIG. 10, other types of directional antennas or beam antennas can be employed, such as antenna arrays, Yagi antennas, log-periodic (LP) antennas, reflector antennas, active antennas such as active phased arrays (APA), electronically steered arrays, or variations thereof. Antenna management element 1068 can control orientation, direction, and aiming of one or more dish elements or feed elements. Antenna management element 1068 may orient antenna elements based on locations of target satellite devices using various electromechanical actuators, such as motors, servos, gimbals, rotors, and the link. When phased array antenna devices are employed, antenna management element 1068 might instead control active elements of the phased array or perform additional tilt operations for the phased array.

Terrestrial communication interface 1070 is configured to communicate over one or more communication links 1075 to support at least communications with one or more external systems, other child nodes, or with one or more airborne communication nodes. Terrestrial communication interface 1070 comprises one or more transceivers, antennas, antenna arrays, RF or optical amplifiers, airborne node trackers, phased antenna arrays, optical aiming apparatuses, and other RF or optical communication circuitry and equipment. Terrestrial communication interface 1070 can employ various communication interface types and protocols, such as Internet Protocol (IP) versions 4 or 6, Ethernet, universal serial bus (USB), Wireless USB, Peripheral Component Interconnect Express (PCIe), Thunderbolt, Bluetooth, IEEE 802.11 (WiFi), WiMAX (Worldwide Interoperability for Microwave Access), microwave RF communications, VHF communications, UHF communications, low-power wide-area network (LPWAN), LoRa (Long Range), low-rate wireless personal area networks (LR-WPANs), IEEE 802.15.4 (Zigbee, among others), Near-field communication (NFC), Infrared Data Association (IrDA), hybrid fiber-coax (HFC), synchronous optical networking (SONET), asynchronous transfer mode (ATM), Time Division Multiplex (TDM), Code Division Multiplex (CDM), Code Division Multiple Access (CDMA), Chaotic Waveforms, Long-Term Evolution (LTE), 3rd Generation Partnership Project (3GPP)-defined protocols, 5G or 5G NR (New Radio) communications, or other communication signaling or communication formats, including combinations, improvements, or variations thereof.

Object node communication interface 1080 is configured to communicate over one or more communication links 1085 to support at least communications with one or more object nodes local to child node 1010. Object node communication interface 1080 comprises one or more transceivers, antennas, antenna arrays, RF or optical amplifiers, and other RF or optical communication circuitry and equipment. Object node communication interface 1080 can employ various communication interface types and protocols, such as Internet Protocol (IP) versions 4 or 6, Ethernet, universal serial bus (USB), Wireless USB, Peripheral Component Interconnect Express (PCIe), Thunderbolt, Bluetooth, IEEE 802.11 (WiFi), WiMAX (Worldwide Interoperability for Microwave Access), microwave RF communications, VHF communications, UHF communications, low-power wide-area network (LPWAN), LoRa (Long Range), low-rate wireless personal area networks (LR-WPANs), IEEE 802.15.4 (Zigbee, among others), Near-field communication (NFC), Infrared Data Association (IrDA), hybrid fiber-coax (HFC), synchronous optical networking (SONET), asynchronous transfer mode (ATM), Time Division Multiplex (TDM), Long-Term Evolution (LTE), 3rd Generation Partnership Project (3GPP)-defined protocols, 5G or 5G NR (New Radio) communications, or other communication signaling or communication formats, including combinations, improvements, or variations thereof.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

What is claimed is:

1. A computing node, comprising:
    a communication interface configured to communicate with a plurality of child nodes over corresponding satellite communication links; and
    a resource manager configured to:
    determine physical resources local to each of the plurality of child nodes;
    establish a free pool of resources available to support execution of applications from among the physical resources of the plurality of child nodes;
    responsive to a request for execution of an application, allocate resources from the free pool of resources for execution of the application at one or more selected child nodes;
    initiate execution of the application using the allocated resources at the one or more selected child nodes;
    identify properties of at least a first satellite communication link associated with a first child node to determine if the first satellite communication link supports activities of the application with regard to the first child node; and
    instruct the first child node to alter the first satellite communication link responsive to the first satellite communication link determined to not support the activities.

2. The computing node of claim 1, wherein the physical resources comprise processing resources, storage resources, communication link resources, and telemetry resources.

3. The computing node of claim 1, wherein the application comprises monitoring activities employing sensor resources included at the one or more selected child nodes, and communication activities employing communication link resources included at the one or more selected child nodes to relay data collected by the sensor resources.

4. The computing node of claim 1, wherein the application comprises data caching activities initiated responsive to user activity of a first requestor node coupled via a local communication interface to a first child node, and wherein the first child node is configured to serve cached data to at least a second requestor node.

5. The computing node of claim 1, comprising:
    the resource manager configured to select physical resources across the more than one selected child nodes for execution of the application; and the resource manager configured to transfer at least a portion of the application to each of the more than one selected child nodes over corresponding ones of the satellite communication links.

6. The computing node of claim 1, comprising:
the resource manager configured to query the plurality of child nodes over the corresponding satellite communication links to assemble the free pool of resources from among the physical resources at each of the plurality of child nodes; and
responsive to the request for execution of the application, the resource manager configured to remove the allocated resources from the free pool of resources until at least completion of execution of the application.

7. The computing node of claim 1, wherein the child nodes provide network connectivity over the corresponding satellite communication links to one or more user devices or one or more sensor devices coupled over local communication interfaces of the child nodes, and wherein the one or more user devices and the one or more sensor devices comprise the physical resources.

8. The computing node of claim 1, comprising:
during execution of the application by at least the first child node, the resource manager configured to monitor utilization of resources of the first child node associated with execution of the application; and
responsive to the utilization exceeding a threshold level, the resource manager configured to shift at least a portion of the application for execution by a second child node to reduce the utilization of resources of the first child node.

9. A method of operating a computing node, the method comprising:
communicating with a plurality of child nodes over corresponding satellite communication links;
determining physical resources local to each of the plurality of child nodes;
establishing a free pool of resources available to support execution of applications from among the physical resources of the plurality of child nodes;
responsive to a request for execution of an application, allocating resources from the free pool of resources for execution of the application at one or more selected child nodes;
initiating execution of the application using the allocated resources at the one or more selected child nodes;
identifying properties of at least a first satellite communication link associated with a first child node to determine if the first satellite communication link supports activities of the application with regard to the first child node; and
instructing the first child node to alter the first satellite communication link responsive to the first satellite communication link determined to not support the activities.

10. The method of claim 9, wherein the physical resources comprise processing resources, storage resources, communication link resources, and telemetry resources.

11. The method of claim 9, wherein the application comprises monitoring activities employing sensor resources included at the one or more selected child nodes, and communication activities employing communication link resources included at the one or more selected child nodes to relay data collected by the sensor resources.

12. The method of claim 9, wherein the application comprises data caching activities initiated responsive to user activity of a first requestor node coupled via a local communication interface to a first child node, and wherein the first child node is configured to serve cached data to at least a second requestor node.

13. The method of claim 9, further comprising:
selecting physical resources across the more than one selected child nodes for execution of the application; and
transferring at least a portion of the application to each of the more than one selected child nodes over corresponding ones of the satellite communication links.

14. The method of claim 9, further comprising:
querying the plurality of child nodes over the corresponding satellite communication links to assemble the free pool of resources from among the physical resources at each of the plurality of child nodes; and
responsive to the request for execution of the application, removing the allocated resources from the free pool of resources until at least completion of execution of the application.

15. The method of claim 9, wherein the child nodes provide network connectivity over the corresponding satellite communication links to one or more user devices or one or more sensor devices coupled over local communication interfaces of the child nodes, and wherein the one or more user devices and the one or more sensor devices comprise the physical resources.

16. The method of claim 9, further comprising:
during execution of the application by at least the first child node, monitoring utilization of resources of the first child node associated with execution of the application; and
responsive to the utilization exceeding a threshold level, shifting at least a portion of the application for execution by a second child node to reduce the utilization of resources of the first child node.

17. An apparatus, comprising:
one or more computer readable storage media; and
program instructions stored on the one or more computer readable storage media that, based on being read and executed by a processing system, direct the processing system to at least:
communicate with a plurality of child nodes over corresponding satellite communication links;
determine physical resources local to each of the plurality of child nodes;
establish a free pool of resources available to support execution of applications from among the physical resources of the plurality of child nodes;
responsive to a request for execution of an application, allocate resources from the free pool of resources for execution of the application at one or more selected child nodes;
initiate execution of the application using the allocated resources at the one or more selected child nodes;
identify properties of at least a first satellite communication link associated with a first child node to determine if the first satellite communication link supports activities of the application with regard to the first child node; and
instruct the first child node to alter the first satellite communication link responsive to the first satellite communication link determined to not support the activities.

18. The apparatus of claim 17, comprising further program instructions, based on being executed by the processing system, direct the processing system to at least:

select physical resources across the more than one selected child nodes for execution of the application; and transfer at least a portion of the application to each of the more than one selected child nodes over corresponding ones of the satellite communication links.

19. A computing node, comprising:

a communication interface configured to communicate with a plurality of child nodes over corresponding satellite communication links; and a resource manager configured to:

determine physical resources local to each of the plurality of child nodes;

establish a free pool of resources available to support execution of applications from among the physical resources of the plurality of child nodes;

responsive to a request for execution of an application, allocate resources from the free pool of resources for execution of the application at one or more selected child nodes;

initiate execution of the application using the allocated resources at the one or more selected child nodes;

during execution of the application by at least a first child node, monitor utilization of resources of the first child node associated with execution of the application; and responsive to the utilization exceeding a threshold level, shift at least a portion of the application for execution by a second child node to reduce the utilization of resources of the first child node.

20. A method of operating a computing node, the method comprising:

communicating with a plurality of child nodes over corresponding satellite communication links;

determining physical resources local to each of the plurality of child nodes;

establishing a free pool of resources available to support execution of applications from among the physical resources of the plurality of child nodes;

responsive to a request for execution of an application, allocating resources from the free pool of resources for execution of the application at one or more selected child nodes;

initiating execution of the application using the allocated resources at the one or more selected child nodes;

during execution of the application by at least a first child node, monitoring utilization of resources of the first child node associated with execution of the application; and responsive to the utilization exceeding a threshold level, shifting at least a portion of the application for execution by a second child node to reduce the utilization of resources of the first child node.

21. An apparatus, comprising:

one or more computer readable storage media; and program instructions stored on the one or more computer readable storage media that, based on being read and executed by a processing system, direct the processing system to at least:

communicate with a plurality of child nodes over corresponding satellite communication links;

determine physical resources local to each of the plurality of child nodes;

establish a free pool of resources available to support execution of applications from among the physical resources of the plurality of child nodes;

responsive to a request for execution of an application, allocate resources from the free pool of resources for execution of the application at one or more selected child nodes;

initiate execution of the application using the allocated resources at the one or more selected child nodes;

during execution of the application by at least a first child node, monitor utilization of resources of the first child node associated with execution of the application; and responsive to the utilization exceeding a threshold level, shift at least a portion of the application for execution by a second child node to reduce the utilization of resources of the first child node.

* * * * *